(12) United States Patent
Feng

(10) Patent No.: US 11,064,557 B2
(45) Date of Patent: Jul. 13, 2021

(54) METHOD AND DEVICE FOR ESTABLISHING RADIO RESOURCE CONTROL CONNECTION

(71) Applicant: GUANGDONG OPPO MOBILE TELECOMMUNICATIONS CORP., LTD., Guangdong (CN)

(72) Inventor: Bin Feng, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 458 days.

(21) Appl. No.: 16/069,385

(22) PCT Filed: Mar. 30, 2016

(86) PCT No.: PCT/CN2016/077915
§ 371 (c)(1),
(2) Date: Jul. 11, 2018

(87) PCT Pub. No.: WO2017/166140
PCT Pub. Date: Oct. 5, 2017

(65) Prior Publication Data
US 2019/0045574 A1    Feb. 7, 2019

(51) Int. Cl.
*H04W 76/27* (2018.01)
*H04W 72/04* (2009.01)
(Continued)

(52) U.S. Cl.
CPC .......... *H04W 76/27* (2018.02); *H04B 7/155* (2013.01); *H04W 72/04* (2013.01); *H04W 76/12* (2018.02); *H04W 88/04* (2013.01); *H04W 88/06* (2013.01)

(58) Field of Classification Search
None
See application file for complete search history.

(56) References Cited

U.S. PATENT DOCUMENTS

2014/0254523 A1* 9/2014 Chai ............... H04W 76/14
370/329
2014/0349694 A1* 11/2014 Raghothaman ....... H04W 76/25
455/509
(Continued)

FOREIGN PATENT DOCUMENTS

CN    103139930 A    6/2013
CN    103813454 A    5/2014
(Continued)

OTHER PUBLICATIONS

International Search Report in international application No. PCT/CN2016/077915, dated Dec. 30, 2016.
(Continued)

*Primary Examiner* — Gregory B Sefcheck
*Assistant Examiner* — Srinivasa R Reddivalam
(74) *Attorney, Agent, or Firm* — Ladas & Parry LLP

(57) ABSTRACT

Provided are a method and device for establishing a radio resource control (RRC) connection. The method includes: a relay terminal device receiving a first access stratum data packet sent by a remote terminal device, wherein the first access stratum data packet carries a device tag of the remote terminal device and RRC connection request information; the relay terminal device generating a second access stratum data packet on the basis of the first access stratum data packet; the relay terminal device sending the second access stratum data packet to a network device; the relay terminal device receiving a third access stratum data packet sent by the network device, wherein the third access stratum data packet carries the device tag of the remote terminal device and information for establishing an RRC connection; the relay terminal device generating a fourth access stratum data packet on the basis of the third access stratum data packet; and the relay terminal device sending the fourth access stratum data packet to the remote terminal device. The
(Continued)

invention thereby allows a terminal device outside a coverage of a network device to generate an RRC connection.

18 Claims, 7 Drawing Sheets

(51) Int. Cl.
| | |
|---|---|
| *H04W 76/12* | (2018.01) |
| *H04B 7/155* | (2006.01) |
| *H04W 88/04* | (2009.01) |
| *H04W 88/06* | (2009.01) |

(56) References Cited

U.S. PATENT DOCUMENTS

| | | | |
|---|---|---|---|
| 2015/0163822 A1* | 6/2015 | Guo | H04W 72/121 |
| | | | 370/329 |
| 2015/0282236 A1 | 10/2015 | Chai et al. | |
| 2015/0289282 A1* | 10/2015 | Phuyal | H04B 3/232 |
| | | | 370/329 |
| 2015/0341974 A1 | 11/2015 | Wu et al. | |
| 2016/0212682 A1 | 7/2016 | Chung et al. | |
| 2016/0241325 A1 | 8/2016 | Raghothaman et al. | |
| 2016/0295621 A1 | 10/2016 | Han et al. | |
| 2018/0084497 A1* | 3/2018 | Jung | H04W 72/0406 |
| 2018/0310335 A1* | 10/2018 | Tang | H04W 74/004 |
| 2018/0324879 A1* | 11/2018 | Lecroart | H04L 69/322 |
| 2018/0343558 A1* | 11/2018 | Ma | H04L 61/2007 |
| 2019/0021123 A1* | 1/2019 | Ma | H04B 7/155 |

FOREIGN PATENT DOCUMENTS

| | | |
|---|---|---|
| CN | 103906266 A | 7/2014 |
| CN | 105657838 A | 6/2016 |
| EP | 2773129 A1 | 9/2014 |
| JP | 2013515421 A | 5/2013 |
| JP | 2017511982 A | 4/2017 |
| WO | 2012163302 A1 | 12/2012 |
| WO | 2013086316 A1 | 6/2013 |
| WO | 2014205772 A1 | 12/2014 |
| WO | 2015026200 A1 | 2/2015 |
| WO | 2015125479 A1 | 8/2015 |

OTHER PUBLICATIONS

Written Opinion of the International Search Authority in international application No. PCT/CN2016/077915, dated Dec. 30, 2016.
Huawei, HiSilicon, UE-to-Network Relay connection establishment, 3GPP TSG-RAN WG2#91 R2-153241, Aug. 28, 2015.
OPPO, Discussion on the Scenario and Scope for FeD2D, 3GPP TSG-RAN WG2#93bis R2-162195, Apr. 1, 2016.
First Office Action in corresponding Japanese application No. 2018-543727, dated Feb. 4, 2020.
Office Action of the Indian application No. 201817035912, dated Jul. 3, 2020.
Office Action of the Taiwanese application No. 106110880, dated Jul. 23, 2020.
English Translation of the Written Opinion of the International Search Authority in international application No. PCT/CN2016/077915, dated Dec. 30, 2016.
Supplementary European Search Report in European application No. 113895921.1, dated Dec. 20, 2018.
ZTE: "On connection establishment over PC5", 3GPP Draft; R2-152548—On Connection Establishment Over PC5, 3rd Generation Partnership Project (3GPP), Mobile Competence Centre ; 650, Route Des Lucioles ; F-06921 Sophia—Antipolis Cedex; France vol. RAN WG2, No. Fukuoka, Japan; 20150525-20150529 24 May 2015 (May 24, 2015), XP050973322, Retrieved from the Internet: URL:http://www.3gpp.org/ftp/Meetings 3GPP SYNC/RAN2/Docs/—[retrieved on May 24, 2015]* the whole document.
Intel Corporation: "Clarification on the conditions for SidelinkUEinforrnation transmission and RRC connection establishment", 3GPP Draft; R2-161343, 3rd Generation Partnership Project (3GPP), Mobile Competence Centre ; 650, Route Des Lucioles ; F-06921 Sophia-Antipolis Cedex; France vol. RAN WG2, No. St. Julian's, Malta; 20160215-20160219 14 Feb. 2016 (Feb. 14, 2016), XP051e55248, Retrieved from the Internet: URL:http://www.3gpp.org/ftp/Meetings 3GPP SYNC/RAN2/Docs/.
"3rd Generation Partnership Project; Technical Specification Group Services and System Aspects; Study on architecture enhancements for Cellular Internet of Things (Release 13)" 3GPP Draft; 23720-D00, 3rd Generation Partnership Project (3GPP), Mobilecompetence Centre ; 650, Route Des Lucioles ; F-06921 Sophia—Antipolis Cedex; France2' Mar. 4, 2016 (Mar. 24, 2010), XP051086108, Retrieved from the Internet: URL:http://www.3gpp.org/ftp/tsg sa/WG2 Arch/Latest SA2 Specs/Rel-13/ Mar. 24, 2016]*.
"3rd Generation Partnership Project; Technical Specification Group Services and System Aspects; Study on Machine-Type Communications (MTC) and other mobile data applications communications enhancements (Release 12)", 3GPP Standard; 3GPP TR 23.887, 3rd Generation Partnership Project (3GPP) Mobile Competence Centre ; 650, Route Deslucioles ; F-06921 Sophia—Antipolis Cedex; France, vol. SA WG2, No. v12.0.0, Dec. 20, 2013 (Dec. 20, 2013), pp. 1-151, XP050729146.
3GPP TS 23.303 V13.2.0 (Dec. 2015), 3rd Generation Partnership Project; Technical Specification Group Services and System Aspects; Proximity-based services (ProSe), Stage 2, (Retease 13), pp. 1-122.
3GPP TS 36.331 V13.0.0 (Dec. 2015), 3rd Generation Partnership Project Technical Specificalion Group Radio Access Network; Evolved Universal Terrestrial Radio Access (E-UTRA): Radio Resource Controt (RRC); Protocol specification, (Release 13), pp. 1-507.
Decision of re-examination of the Taiwanese application No. 106110880, dated Nov. 27, 2020.

\* cited by examiner

METHOD AND DEVICE FOR ESTABLISHING RADIO RESOURCE CONTROL CONNECTION

RELATED APPLICATION

This application is an application under 35 U.S.C. 371 of International Application No. PCT/CN2016/077915 filed on Mar. 30, 2016, the entire contents of which are incorporated herein by reference.

TECHNICAL FIELD

Embodiments of the disclosure relate to the field of communications, and more particularly to a method and apparatus for establishing a Radio Resource Control (RRC) connection.

BACKGROUND

At present, according to a communication method, when a terminal device is within coverage of a network device, a Radio Resource Control (RRC) connection may be established between the terminal device and the network device. Data transmission may be controlled based on the RRC connection.

However, when being outside the coverage of network device, the terminal device fails to transmit/receive signaling to/from the network device. Thus, the RRC connection cannot be established.

Therefore, it is desired to provide a solution capable of establishing an RRC connection for a terminal device that is outside coverage of a network device.

SUMMARY

The disclosure provides a method and apparatus for establishing a Radio Resource Control (RRC) connection, which may establish an RRC connection for terminal device in coverage of network device.

A first aspect provides a method for establishing a RRC connection. The method may be applied in a communication system including a remote terminal device, a relay terminal device and a network device. The remote terminal device communicates with the relay terminal device based on a first communication protocol and the relay terminal device communicates with the network device based on a second communication protocol. The method includes the following actions. The relay terminal device receives a first access-stratum data packet sent from the remote terminal device according to the first communication protocol. The first access-stratum data packet is generated through encapsulating, by the remote terminal device, an RRC connection establishment request message to be sent to the network device. The first access-stratum data packet may contain a device identifier of the remote terminal device. The relay terminal device generates a second access-stratum data packet according to the first access-stratum data packet. The second access-stratum data packet may contain the device identifier of the remote terminal device. The relay terminal device sends the second access-stratum data packet to the network device according to the second communication protocol. The relay terminal device receives a third access-stratum data packet sent from the network device according to the second communication protocol. The third access-stratum data packet is generated through encapsulating, by the network device, an RRC connection establishment message to be sent to the remote terminal device. The RRC connection establishment message may be generated by the network device according to the device identifier of the remote terminal device and the RRC connection establishment request message. The third access-stratum data packet may contain the device identifier of the remote terminal device. The relay terminal device generates a fourth access-stratum data packet according to the third access-stratum data packet. The fourth access-stratum data packet may contain the device identifier of the remote terminal device. The relay terminal device sends the fourth access-stratum data packet to the remote terminal device according to the first communication protocol.

In combination with the first aspect, in a first implementation mode of the first aspect, the device identifier of the remote terminal device may be encapsulated in the first access-stratum data packet by the remote terminal device in Layer 2 (L2). The device identifier of the remote terminal device may be encapsulated in the third access-stratum data packet by the network device in L2. The method may further include the following actions. The relay terminal device acquires the device identifier of the remote terminal device from the first access-stratum data packet in L2. The relay terminal device encapsulates the device identifier of the remote terminal device in the second access-stratum data packet in L2. The relay terminal device acquires the device identifier of the remote terminal device from the third access-stratum data packet in L2. The relay terminal device encapsulates the device identifier of the remote terminal device in the fourth access-stratum data packet in L2.

In combination with the first aspect and the abovementioned implementation mode thereof, in a second implementation mode of the first aspect, the device identifier of the remote terminal device may be encapsulated in the first access-stratum data packet by the remote terminal device in L2. The device identifier of the remote terminal device may be encapsulated in the third access-stratum data packet by the network device in L2. The method may further include the following actions. The relay terminal device acquires the device identifier of the remote terminal device from the first access-stratum data packet in L2. The relay terminal device encapsulates the device identifier of the remote terminal device in the second access-stratum data packet in L2. The relay terminal device acquires the device identifier of the remote terminal device from the third access-stratum data packet in L2. The relay terminal device encapsulates the device identifier of the remote terminal device in the fourth access-stratum data packet in L2.

In combination with the first aspect and the abovementioned implementation modes thereof, in a third implementation mode of the first aspect, the device identifier of the remote terminal device may be encapsulated in the first access-stratum data packet by the remote terminal device in an adaptive layer. The device identifier of the remote terminal device may be encapsulated in the third access-stratum data packet by the network device in L2. The method may further include the following actions. The relay terminal device acquires the device identifier of the remote terminal device from the first access-stratum data packet in an adaptive layer. The relay terminal device encapsulates the device identifier of the remote terminal device in the second access-stratum data packet in L2. The relay terminal device acquires the device identifier of the remote terminal device from the third access-stratum data packet in L2. The relay terminal device encapsulates the device identifier of the remote terminal device in the fourth access-stratum data packet in the adaptive layer.

In combination with the first aspect and the abovementioned implementation modes thereof, in a fourth implementation mode of the first aspect, the device identifier of the remote terminal device may be encapsulated in the first access-stratum data packet by the remote terminal device in an RRC layer. The device identifier of the remote terminal device may be encapsulated in the third access-stratum data packet by the network device in the RRC layer.

In combination with the first aspect and the abovementioned implementation modes thereof, in a fifth implementation mode of the first aspect, the method may further include the following actions. The relay terminal device acquires a first Logical Channel Identifier (LCID) from the first access-stratum data packet. The first LCID may be determined by the remote terminal device according to a first bearer. The relay terminal device determines a second LCID according to the first LCID. The network device may determine the first bearer according to the second LCID. The relay terminal device encapsulates the second LCID in the second access-stratum data packet.

In combination with the first aspect and the abovementioned implementation modes thereof, in a sixth implementation mode of the first aspect, the action of determining, by the relay terminal device, the second LCID according to the first LCID may include the following actions. When the first LCID is allocated to the remote terminal device by the network device, the relay terminal device determines the first LCID to be the second LCID. When the first LCID is determined by the remote terminal device based on first preset rule stored in the remote terminal device, the relay terminal device determines an LCID corresponding to the first bearer under a second preset rule to be the second LCID. Under a first preset rule, the first LCID may correspond to the first bearer. The second preset rule may be stored in the network device.

In combination with the first aspect and the abovementioned implementation modes thereof, in a seventh implementation mode of the first aspect, an adaptive layer may be configured in the network device and the remote terminal device. The first access-stratum data packet may contain a third LCID. The third LCID may be allocated to the remote terminal device by the network device, or the third LCID may be determined by the remote terminal device based on third preset rule stored in the remote terminal device and the network device. The third LCID may be encapsulated in the first access-stratum data packet by the remote terminal device in the adaptive layer. The method may further include the following actions. The relay terminal device encapsulates a preset LCID in the second access-stratum data packet. The preset LCID may be configured to indicate that the second access-stratum data packet is relay data, so as to enable the network device to acquire the third LCID in the adaptive layer according to the preset LCID.

In combination with the first aspect and the abovementioned implementation modes thereof, in an eighth implementation mode of the first aspect, the method may further include the following actions. The relay terminal device acquires a fourth LCID from the third access-stratum data packet. The fourth LCID may be determined by the network device according to a second bearer. The relay terminal device determines a fifth LCID according to the fourth LCID. The remote terminal device may determine the second bearer according to the fifth LCID. The relay terminal device encapsulates the fifth LCID in the fourth access-stratum data packet.

In combination with the first aspect and the implementation modes thereof, in a ninth implementation mode of the first aspect, the action of determining, by the relay terminal device, the fifth LCID according to the fourth LCID may include the following actions. When the fourth LCID is allocated to the remote terminal device by the network device, the relay terminal device determines the fourth LCID to be the fifth LCID. When the fourth LCID is determined by the network device based on fourth preset rule stored in the network device, the relay terminal device determines an LCID corresponding to the second bearer under a fifth preset rule to be the fifth LCID. Under a fourth preset rule, the fourth LCID may correspond to the second bearer. The fifth preset rule may be stored in the remote terminal device.

In combination with the first aspect and the implementation modes thereof, in a tenth implementation mode of the first aspect, the adaptive layer may be configured in the network device and the remote terminal device. The third access-stratum data packet may contain a sixth LCID. The sixth LCID may be allocated to the remote terminal device by the network device, or the sixth LCID may be determined by the remote terminal device based on sixth preset rule stored in the remote terminal device and the network device. The sixth LCID may be encapsulated in the third access-stratum data packet by the network device in the adaptive layer, and the method may further include the following actions. The relay terminal device encapsulates the preset LCID in the fourth access-stratum data packet. The preset LCID may be configured to indicate that the fourth access-stratum data packet is the relay data, so as to enable the remote terminal device to acquire the sixth LCID in the adaptive layer according to the preset LCID.

In combination with the first aspect and the abovementioned implementation modes thereof, in an eleventh implementation mode of the first aspect, before the action of generating, by the relay terminal device, the fourth access-stratum data packet according to the third access-stratum data packet, the method may further include the following actions. The relay terminal device determines that the third access-stratum data packet contains a specific LCID or a specific Radio Network Temporary Identity (RNTI). The specific LCID is configured to indicate that the third access-stratum data packet is the relay data and the specific RNTI is configured to indicate that the third access-stratum data packet is the relay data.

In combination with the first aspect and the abovementioned implementation modes thereof, in a twelfth implementation mode of the first aspect, the action of sending, by the relay terminal device, the second access-stratum data packet to the network device according to the second communication protocol may include the following actions. The relay terminal device acquires first mapping relationship information. The first mapping relationship information is configured to indicate a one-to-one mapping relationship between multiple data volume intervals and multiple uplink channels. Each of the data volume intervals may include at least one data volume. The relay terminal device determines a first uplink channel according to a data volume interval to which a data volume of the second access-stratum data packet belongs and the first mapping relationship information. The first uplink channel may correspond to the data volume interval to which the data volume of the second access-stratum data packet belongs. The relay terminal device sends a resource request message to the network device through the first uplink channel. The relay terminal device receives first scheduling information sent from the network device. The first scheduling information is configured to indicate a first transmission resource and a magnitude of the first transmission resource is determined by the network device according to the first uplink channel and the first mapping relationship information. The relay terminal device sends the second access-stratum data packet to the network device through the first transmission resource according to the second communication protocol.

In combination with the first aspect and the abovementioned implementation modes thereof, in a thirteenth implementation mode of the first aspect, the action of sending, by the relay terminal device, the second access-stratum data packet to the network device according to the second communication protocol may include the following actions. The relay terminal device acquires second mapping relationship information. The second mapping relationship information is configured to indicate a one-to-one mapping relationship between multiple data volume intervals and multiple preambles. Each of the data volume intervals may include at least one data volume. The relay terminal device determines a first preamble according to the data volume interval to which the data volume of the second access-stratum data packet belongs and the second mapping relationship information. The first preamble may correspond to the data volume interval to which the data volume of the second access-stratum data packet belongs. The relay terminal device sends the first preamble to the network device. The relay terminal device receives second scheduling information sent from the network device. The second scheduling information is configured to indicate a second transmission resource and a magnitude of the second transmission resource is determined by the network device according to the first preamble and the second mapping relationship information. The relay terminal device sends the second access-stratum data packet to the network device through the second transmission resource according to the second communication protocol.

In combination with the first aspect and the abovementioned implementation modes thereof, in a fourteenth implementation mode of the first aspect, the first access-stratum data packet and the fourth access-stratum data packet may be data packets specified by the first communication protocol, and the second access-stratum data packet and the third access-stratum data packet may be data packets specified by the second communication protocol.

In combination with the first aspect and the abovementioned implementation modes thereof, in a fifteenth implementation mode of the first aspect, the method may further include the following actions. The relay terminal device receives a fifth access-stratum data packet sent from the remote terminal device according to the first communication protocol. The fifth access-stratum data packet is generated through encapsulating, by the remote terminal device, an RRC connection establishment completed message to be sent to the network device. The fifth access-stratum data packet may contain the device identifier of the remote terminal device. The RRC connection establishment completed message may be generated by the remote terminal device according to the device identifier of the remote terminal device and the RRC connection establishment message. The relay terminal device generates a sixth access-stratum data packet according to the fifth access-stratum data packet. The sixth access-stratum data packet may contain the device identifier of the remote terminal device. The relay terminal device sends the sixth access-stratum data packet to the network device according to the second communication protocol.

A second aspect provides a method for establishing a RRC connection. The method may be applied in a communication system including a remote terminal device, a relay terminal device and a network device. The remote terminal device communicates with the relay terminal device based on a first communication protocol and the relay terminal device communicates with the network device based on a second communication protocol. The method includes the following actions. The remote terminal device encapsulates an RRC connection establishment request message to be sent to the network device to generate a first access-stratum data packet. The first access-stratum data packet may contain a device identifier of the remote terminal device. The remote terminal device sends the first access-stratum data packet to the relay terminal device according to the first communication protocol. The remote terminal device sends a fourth access-stratum data packet to the relay terminal device according to the first communication protocol. The fourth access-stratum data packet may contain the device identifier of the remote terminal device.

In combination with the second aspect, in a first implementation mode of the second aspect, the method may further include the following actions. The remote terminal device encapsulates the device identifier of the remote terminal device in the first access-stratum data packet in L2. The remote terminal device acquires the device identifier of the remote terminal device from the fourth access-stratum data packet in L2.

In combination with the second aspect and the abovementioned implementation mode thereof, in a second implementation mode of the second aspect, the method may further include the following actions. The remote terminal device encapsulates the device identifier of the remote terminal device in the first access-stratum data packet in an adaptive layer. The remote terminal device acquires the device identifier of the remote terminal device from the fourth access-stratum data packet in the adaptive layer.

In combination with the second aspect and the abovementioned implementation mode thereof, in a third implementation mode of the second aspect, the method may further include the following actions. The remote terminal device encapsulates the device identifier of the remote terminal device in the first access-stratum data packet in an RRC layer. The remote terminal device acquires the device identifier of the remote terminal device from the fourth access-stratum data packet in the RRC layer.

In combination with the second aspect and the abovementioned implementation modes thereof, in a fourth implementation mode of the second aspect, an adaptive layer may be configured in the network device and the remote terminal device. A third access-stratum data packet may contain a sixth LCID. The sixth LCID may be allocated to the remote terminal device by the network device, or the sixth LCID may be determined by the remote terminal device based on sixth preset rule stored in the remote terminal device and the network device. The sixth LCID may be encapsulated in the third access-stratum data packet by the network device in the adaptive layer. The method may further include the following actions. The remote terminal device acquires the sixth LCID in the adaptive layer according to a preset LCID contained in the fourth access-stratum data packet. The preset LCID may be encapsulated in the fourth access-stratum data packet by the relay terminal device. The preset LCID may be configured to indicate that the fourth access-stratum data packet is relay data.

In combination with the second aspect and the abovementioned implementation modes thereof, in a fifth implementation mode of the second aspect, the first access-stratum data packet and the fourth access-stratum data packet may be data packets specified by the first communication protocol.

In combination with the second aspect and the above-mentioned implementation modes thereof, in a sixth implementation mode of the second aspect, the method may further include the following actions. The remote terminal device generates an RRC connection establishment completed message to be sent to the network device according to the device identifier of the remote terminal device and an RRC connection establishment message. The remote terminal device encapsulates the RRC connection establishment completed message to generate a fifth access-stratum data packet. The fifth access-stratum data packet may contain the device identifier of the remote terminal device. The remote terminal device sends the fifth access-stratum data packet to the relay terminal device according to the first communication protocol.

A third aspect provides a method for establishing a RRC connection. The method may be applied in a communication system including a remote terminal device, a relay terminal device and a network device. The remote terminal device communicates with the relay terminal device based on a first communication protocol and the relay terminal device communicates with the network device based on a second communication protocol. The method includes the following actions. The network device receives a second access-stratum data packet sent from the relay terminal device according to the second communication protocol. The second access-stratum data packet contains a device identifier of the remote terminal device. The second access-stratum data packet is generated by the relay terminal device according to a first access-stratum data packet and the first access-stratum data packet is generated through encapsulating, by the remote terminal device, an RRC connection establishment request message to be sent to the network device. The network device generates an RRC connection establishment message to be sent to the remote terminal device according to the device identifier, contained in the second access-stratum data packet, of the remote terminal device and the RRC connection establishment request message. The network device encapsulates the RRC connection establishment message to generate a third access-stratum data packet. The third access-stratum data packet may contain the device identifier of the remote terminal device. The network device sends the third access-stratum data packet to the relay terminal device according to the second communication protocol.

In combination with the third aspect, in a first implementation mode of the third aspect, the method may further include the following actions. The network device acquires the device identifier of the remote terminal device from the second access-stratum data packet in L2. The network device encapsulates the device identifier of the remote terminal device in the third access-stratum data packet in L2.

In combination with the third aspect and the abovementioned implementation mode thereof, in a second implementation mode of the third aspect, the method may further include the following actions. The network device acquires the device identifier of the remote terminal device from the second access-stratum data packet in an adaptive layer. The network device encapsulates the device identifier of the remote terminal device in the third access-stratum data packet in the adaptive layer.

In combination with the third aspect and the abovementioned implementation modes thereof, in a third implementation mode of the third aspect, the method may further include the following actions. The network device acquires the device identifier of the remote terminal device from the second access-stratum data packet in an RRC layer. The network device encapsulates the device identifier of the remote terminal device in the third access-stratum data packet in the RRC layer.

In combination with the third aspect and the abovementioned implementation modes thereof, in a fourth implementation mode of the third aspect, an adaptive layer may be configured in the network device and the remote terminal device. The first access-stratum data packet may contain a third LCID. The third LCID may be allocated to the remote terminal device by the network device, or the third LCID may be determined by the remote terminal device based on third preset rule stored in the remote terminal device and the network device. The third LCID may be encapsulated in the first access-stratum data packet by the remote terminal device in the adaptive layer. The method may further include the following actions. The network device acquires the third LCID in the adaptive layer according to a preset LCID in the second access-stratum data packet. The preset LCID may be encapsulated in the second access-stratum data packet by the relay terminal device. The preset LCID may be configured to indicate that the second access-stratum data packet is relay data.

In combination with the third aspect and the abovementioned implementation modes thereof, in a fifth implementation mode of the third aspect, the action of receiving, by the network device, the second access-stratum data packet sent from the relay terminal device according to the second communication protocol may include the following actions. The network device acquires first mapping relationship information. The first mapping relationship information is configured to indicate a one-to-one mapping relationship between multiple data volume intervals and multiple uplink channels. Each of the data volume intervals may include at least one data volume. The network device receives a resource request message sent from the relay terminal device through a first uplink channel. The first uplink channel may correspond to a data volume interval to which a data volume of the second access-stratum data packet belongs. The network device determines a first transmission resource according to the first uplink channel and the first mapping relationship information. The network device sends first scheduling information to the relay terminal device. The first scheduling information is configured to indicate the first transmission resource. The network device receives the second access-stratum data packet sent from the relay terminal device through the first transmission resource according to the second communication protocol.

In combination with the third aspect and the abovementioned implementation modes thereof, in a sixth implementation mode of the third aspect, the action of receiving, by the network device, the second access-stratum data packet sent from the relay terminal device according to the second communication protocol may include the following actions. The network device acquires second mapping relationship information. The second mapping relationship information is configured to indicate a one-to-one mapping relationship between multiple data volume intervals and multiple preambles. Each of the data volume intervals may include at least one data volume. The network device receives a first preamble sent from the relay terminal device. The first preamble may correspond to the data volume interval to which the data volume of the second access-stratum data packet belongs. The network device determines a second transmission resource according to the first preamble and the second mapping relationship information. The network device sends second scheduling information to the relay terminal device. The second scheduling information is configured to indicate the second transmission resource. The network device receives the second access-stratum data packet sent from the relay terminal device through the second transmission resource according to the second communication protocol.

In combination with the third aspect and the abovementioned implementation modes thereof, in a seventh implementation mode of the third aspect, the first access-stratum data packet and the fourth access-stratum data packet may be data packets specified by the first communication protocol. The second access-stratum data packet and the third access-stratum data packet may be data packets specified by the second communication protocol.

In combination with the third aspect and the abovementioned implementation modes thereof, in an eighth implementation mode of the third aspect, the method may further include the following actions. The network device receives a sixth access-stratum data packet sent from the relay terminal device according to the second communication protocol. The sixth access-stratum data packet is generated according to a fifth access-stratum data packet and the fifth access-stratum data packet is generated through encapsulating, by the remote terminal device, an RRC connection establishment completed message to be sent to the network device. The fifth access-stratum data packet may contain the device identifier of the remote terminal device, and the sixth access-stratum data packet may contain the device identifier of the remote terminal device.

In combination with the third aspect and the abovementioned implementation modes thereof, in a ninth implementation mode of the third aspect, the method may further include the following actions. The network device encapsulates a specific LCID or a specific RNTI in the third access-stratum data packet. The specific LCID is configured to indicate that the third access-stratum data packet is the relay data and the specific RNTI is configured to indicate that the third access-stratum data packet is the relay data.

A fourth aspect provides an apparatus for establishing a RRC connection. The apparatus includes units configured to execute each action in the first aspect and each implementation mode of the first aspect.

A fifth aspect provides an apparatus for establishing a RRC connection. The apparatus includes units configured to execute each action in the second aspect and each implementation mode of the second aspect.

A sixth aspect provides an apparatus for establishing a RRC connection. The apparatus includes units configured to execute each action in the third aspect and each implementation mode of the third aspect.

A seventh aspect provides an apparatus for establishing a RRC connection. The apparatus includes a memory and a processor, where the memory is configured to store a computer program, and the processor is configured to call, from the memory, and cause the program computer to enable the apparatus for establishing a RRC connection to execute any method for establishing a RRC connection in the first aspect and various implementation modes thereof.

An eighth aspect provides an apparatus for establishing a RRC connection. The apparatus includes a memory and a processor, where the memory is configured to store a computer program, and the processor is configured to call, from the memory, and operate the program computer to enable the apparatus for establishing a RRC connection to execute any method for establishing a RRC connection in the second aspect and various implementation modes thereof.

A ninth aspect provides an apparatus for establishing a RRC connection. The apparatus includes a memory and a processor, where the memory is configured to store a computer program, and the processor is configured to call, from the memory, and operate the program computer to enable the apparatus for establishing a RRC connection to execute any method for establishing a RRC connection in the third aspect and various implementation modes thereof.

A tenth aspect provides a computer program product. The computer program product includes a computer program code, the computer program code being operated by a receiving unit, processing unit and sending unit or receiver, processor and sender of network device to enable relay terminal device to execute any method for establishing a RRC connection in the first aspect and various implementation modes thereof.

An eleventh aspect provides a computer program product. The computer program includes a computer program code, the computer program code being operated by a receiving unit, processing unit and sending unit or receiver, processor and sender of network device to enable remote terminal device to execute any method for establishing RRC connection in the second aspect and various implementation modes thereof.

A twelfth aspect provides a computer program product. The computer program includes a computer program code, the computer program code being operated by a receiving unit, processing unit and sending unit or receiver, processor and sender of network device to enable network device to execute any method for establishing a RRC connection in the third aspect and various implementation modes thereof.

A thirteenth aspect provides a computer-readable storage medium. The storage medium stores a program, the program enabling relay network device to execute any method for establishing a RRC connection in the first aspect and various implementation modes thereof.

A fourteenth aspect provides a computer-readable storage medium. The storage medium stores a program, the program enabling remote network device to execute any method for establishing a RRC connection in the second aspect and various implementation modes thereof.

A thirteenth aspect provides a computer-readable storage medium. The storage medium stores a program, the program enabling relay network device to execute any method for establishing a RRC connection in the third aspect and various implementation modes thereof.

According to the method and apparatus for establishing a RRC connection of the embodiments of the disclosure, remote terminal device outside coverage of network device sends a first Media Access Control (MAC) Protocol Data Unit (PDU) bearing an RRC connection establishment request message and a device identifier of the remote terminal device to remote terminal device in the coverage of the network device. Moreover, relay terminal device parses the first MAC PDU to acquire the RRC connection establishment request message and sends a second MAC PDU bearing the RRC connection establishment request message and the device identifier of the remote terminal device to the network device. Therefore, the network device may establish an RRC connection for the remote terminal device according to the RRC connection establishment request message and the device identifier of the remote terminal device, encapsulate an RRC connection establishment message configured to bear related information of the RRC connection and the device identifier of the remote terminal device in a third MAC PDU and send the third MAC PDU to the relay terminal device. Therefore, the RRC connection may be established for the remote terminal device out of the coverage of the network device.

BRIEF DESCRIPTION OF DRAWINGS

In order to describe the technical solutions of the embodiments of the disclosure more clearly, the drawings required to be used in the embodiments of the disclosure will be simply introduced below. Apparently, the drawings described below are some embodiments of the disclosure. Other drawings may further be obtained by those of ordinary skilled in the art according to these drawings without creative work.

DETAILED DESCRIPTION

The technical solutions in the embodiments of the disclosure will be clearly and completely described below in combination with the drawings in the embodiments of the disclosure. Apparently, the described embodiments are not all embodiments but part of embodiments of the disclosure. All other embodiments obtained by those of ordinary skilled in the art based on the embodiments in the disclosure without creative work shall fall within the scope of protection of the disclosure.

It should be understood that terms "system" and "network" in the disclosure may usually be exchanged for use in the disclosure. Term "and/or" in the disclosure is only an association relationship describing associated objects and represents that three relationships may exist. For example, A and/or B may represent three conditions, i.e., independent existence of A, coexistence of A and B and independent existence of B. In addition, character "/" in the disclosure usually represents that previous and next associated objects form an "or" relationship.

The solutions of the embodiments of the disclosure may be applied to an existing cellular communication system, for example, systems of a Global System for Mobile Communication (GSM), Wideband Code Division Multiple Access (WCDMA) and Long Term Evolution (LTE), and supported communication mainly includes voice and data communication. Connections supported by a conventional network device are usually limited in number and also easy to implement.

A next-generation mobile communication system will not only support conventional communication but also support Machine to Machine (M2M) communication, or called as Machine Type Communication (MTC). It is predicted that, by 2020, MTC device connected to networks will reach 500 to 1,000 hundred million, which will be far larger than an existing connection number. M2M services have greatly different network requirements due to their greatly different service types. There may roughly exist the following requirements:

reliable transmission but insensitivity to delays; and low delays and high-reliability transmission.

It is easier to process a reliable transmission delay-insensitive service. However, a service of a low-delay and highly-reliable transmission type not only requires a short transmission delay but also requires reliability, for example, a Device to Device (D2D) service. Unreliable transmission may cause retransmission and an excessively long transmission delay and may not meet the requirements. Existence of a large number of connections makes a future wireless communication system greatly different from an existing communication system. A large number of connections require more resources to be consumed for access of terminal device and require more resources to be consumed in transmitting scheduling signaling related to data transmission of the terminal device. The solutions according to the embodiments of the disclosure may effectively solve the resource consumption problem.

Figure 1:
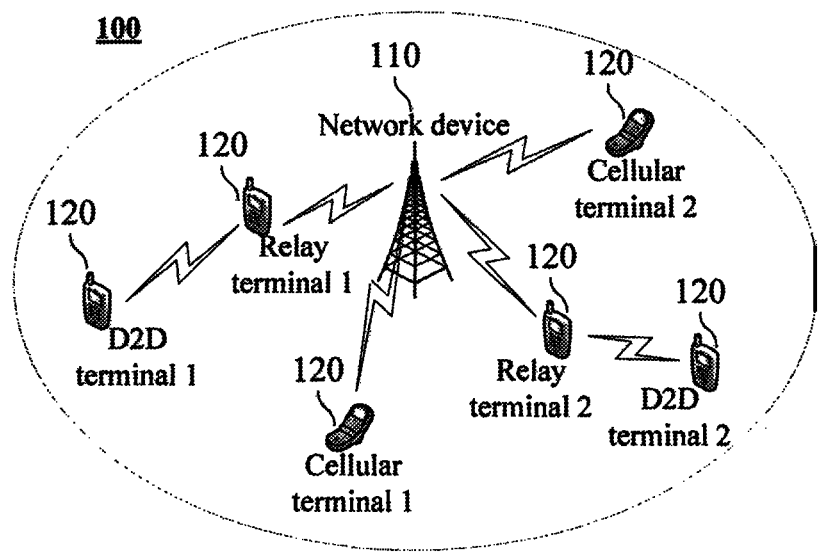
FIG. 1 is a schematic flowchart of a communication system applying a method and apparatus for establishing a RRC connection of an embodiment of the disclosure.

FIG. 1 is a schematic diagram of a wireless communication system 100 applying an embodiment of the disclosure. The wireless communication system 100 may include at least one network device 110. The network device may be device, for example, network device, configured to communicate with mobile device, and the network device may be an Access Point (AP) in a Wireless Local Area Network (WLAN), a Base Transceiver Station (BTS) in the GSM or Code Division Multiple Access (CDMA), may also be a NodeB (NB) in WCDMA, and may further be an Evolutional Node B (eNB or eNodeB) in LTE, or a relay Station (ST) or AP, or vehicle-mounted device, wearable device, terminal device in a future 5th-Generation (5G) network, network device in a future evolved Public Land Mobile Network (PLMN) or the like.

The wireless communication system 100 further includes multiple terminal devices in coverage of the network device 110. The terminal device may be mobile or fixed. The terminal device 120 may also be called as User Equipment (UE), an access terminal, a user unit, a user ST, a mobile ST, a mobile radio ST, a remote ST, a remote terminal, mobile device, a user terminal, a terminal, wireless communication device, a user agent or a user equipment. The terminal device may be an ST in the WLAN, and may be a cell phone, a cordless phone, a Session Initiation Protocol (SIP) phone, a Wireless Local Loop (WLL) ST, a Personal Digital Assistant (PDA), handheld device with a wireless communication function, computing device, other processing device connected to a wireless modem, vehicle-mounted device, wearable device, terminal device in the future 5G network, terminal device in the future evolved PLMN or the like.

FIG. 1 exemplarily shows one network device and six terminal devices. In at least one embodiment, the wireless communication system 100 may include multiple network devices and other numbers of terminal device may be included in coverage of each network device. There are no limits made in the embodiment of the disclosure. In addition, the wireless communication system 100 may further include another network entity such as a Mobile Management Entity (MME), a Serving Gateway (S-GW) and a Packet Data Network Gateway (P-GW), but the embodiment of the disclosure is not limited.

Specifically, the terminal device 120 may perform communication in a cellular communication mode or a D2D communication mode. In the cellular communication mode, the terminal device may communicate with the other terminal device through the network device. In the D2D communication mode, the terminal device may directly communicate with the other terminal device through a D2D link.

The multiple terminal devices 120 shown in FIG. 1 include a cellular terminal device, a D2D terminal device and a relay terminal device. The cellular terminal device adopts a cellular communication technology (i.e., an example of a communication technology specified by a second communication protocol) to communicate with the network device 110. The D2D terminal device implements data transmission with the network device through the relay terminal device. Between the relay terminal device and the D2D terminal device, there is, for example, a PC5 interface and a D2D communication technology (i.e., an example of the communication technology specified by the second communication protocol) is adopted for communication. The D2D communication technology may specifically be a SideLink (SL) technology in LTE and may also be a technology such as Wireless Fidelity (WIFI) or Bluetooth in WLAN or another D2D communication technology, which is not limited in the embodiment of the disclosure. Between the relay terminal device and the network device, there is, for example, a Uu interface and the cellular communication technology is adopted for communication.

In at least one embodiment, the remote device is outside coverage of the network device and the relay terminal device is in the coverage of the network device.

In the embodiment of the disclosure, a protocol stack configured to implement wireless communication is set in each device in the communication system 100.

Moreover, the protocol stack in each device may be the same and may also be different, which is not specially limited in the disclosure.

Exemplarily but unlimitedly, the protocol stack in the embodiment of the disclosure may be a protocol stack used in a 4th-Generation (4G) network such as LTE, may also be a protocol stack used in the future 5G network and may further be a protocol stack configured for D2D communication (for example, a protocol stack used for a technology such as WIFI or Bluetooth in the WLAN), which is not specially limited in the disclosure. For convenient understanding and distinction, descriptions will be made below with the protocol stack specified in LTE as an example.

A protocol stack refers to all protocols of each layer in a network and visually reflects a file transmission process in the network: from an upper-layer protocol to a bottom-layer protocol and then from the bottom-layer protocol to the upper-layer protocol. Exemplarily but unlimitedly, in the embodiment of the disclosure, a protocol stack used for wireless communication may include at least one of the following protocol layers or a combination of multiple protocol layers, and protocols of each layer may include multiple protocol entities. Exemplarily but unlimitedly, the protocol stack in the embodiment of the disclosure may include one or more of the following protocol layers.

1: An RRC Layer

Exemplarily but unlimitedly, the RRC layer mainly has the following functions:

broadcasting of information provided by a non-access stratum of a core network; setup, re-setup, maintenance and release of an RRC connection between UE and a Universal Mobile Telecommunication System (UMTS) Terrestrial Radio Access Network (UTRAN); allocation, reconfiguration and release of an RRC connection radio resource; mobility management over the RRC connection; a paging/notification function; a high-layer PDU routing function; required quality control; measurement reporting and reporting control of the UE; open-loop power control; setting of closed-loop power control for RRC; initial cell selection and cell reselection in an idle mode; time revision control; and the like.

2: A Packet Data Convergence Protocol (PDCP) Layer

Exemplarily but unlimitedly, in the embodiment of the disclosure, the PDCP layer is mainly configured to perform compression and decompression/encryption and decryption on information.

3: A Radio Link Control (RLC) Layer

Exemplarily but unlimitedly, in the embodiment of the disclosure, the RLC layer is mainly configured to realize a related function of Automatic Repeat Request (ARQ) and segmenting and cascading information or restructuring the segmented and cascaded information.

4: A MAC Layer

Exemplarily but unlimitedly, in the embodiment of the disclosure, the MAC layer is mainly configured to select a transmission format combination and realize a related function of scheduling and Hybrid Automatic Repeat Request (HARQ).

5: A Physical (PHY) Layer

Exemplarily but unlimitedly, in the embodiment of the disclosure, the PHY layer is mainly configured to provide information transmission service for the MAC layer and a higher layer and perform coding and modulation processing or demodulation and decoding processing on the selected transmission format combination.

6: An ADP Layer

In the embodiment of the disclosure, the ADP layer may be configured to identify a user identifier, or, the user identifier may be identified in the ADP layer. Moreover, in the embodiment of the disclosure, the ADP layer may be configured between two protocol layers belonging to different communication protocols, thereby converting data processed by one protocol layer into data which may be identified and processed by the other protocol layer.

Exemplarily but unlimitedly, in the embodiment of the disclosure, protocol configuration manners for remote terminal device, relay terminal device and network device may include, but not limited to, the following manners.

A First Manner

Figure 2:
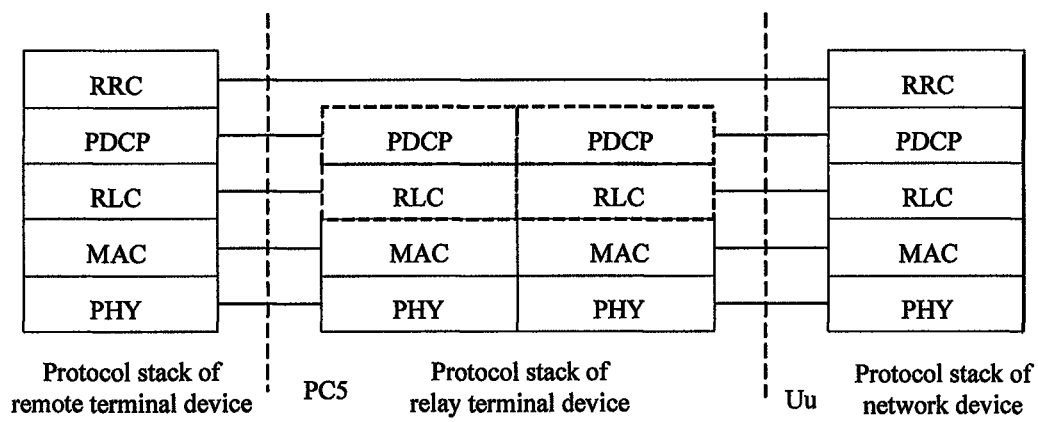
FIG. 2 is a schematic diagram of an example of a protocol stack configuration in each device according to an embodiment of the disclosure.

As shown in FIG. 2, a protocol stack (recorded as protocol stack #A1 hereinafter for convenient understanding and description) corresponding to a first communication protocol is configured in the remote terminal device.

The protocol stack #A1 may include, but not limited to, the following protocol layers:

an RRC layer (recorded as RRC layer #A1 hereinafter for convenient understanding and description) corresponding to the first communication protocol;

a PDCP layer (recorded as PDCP layer #A1 hereinafter for convenient understanding and description) corresponding to the first communication protocol;

an RLC layer (recorded as RLC layer #A1 hereinafter for convenient understanding and description) corresponding to the first communication protocol;

a MAC layer (recorded as MAC layer #A1 hereinafter for convenient understanding and description) corresponding to the first communication protocol; and a PHY layer (recorded as PHY layer #A1 hereinafter for convenient understanding and description) corresponding to the first communication protocol.

Moreover, as shown in FIG. 2, a protocol stack (recorded as protocol stack #B1 hereinafter for convenient understanding and description) corresponding to the first communication protocol is configured in the relay terminal device.

The protocol stack #B1 may include, but not limited to, the following protocol layers:

a PDCP layer (recorded as PDCP layer #B1 hereinafter for convenient understanding and description) corresponding to the first communication protocol;

an RLC layer (recorded as RLC layer #B1 hereinafter for convenient understanding and description) corresponding to the first communication protocol;

a MAC layer (recorded as MAC layer #B1 hereinafter for convenient understanding and description) corresponding to the first communication protocol; and a PHY layer (recorded as PHY layer #B1 hereinafter for convenient understanding and description) corresponding to the first communication protocol.

Therefore, the remote terminal device may process data processed through the protocol stack #B1 of the relay terminal device through the protocol stack #A1, and correspondingly, the relay terminal device may process data processed through the protocol stack #A1 of the remote terminal device through the protocol stack #B1.

It should be understood that the protocol layers, listed above, included in the protocol stack configured in each device are only exemplary descriptions and not intended to limit the disclosure and all other protocol layer configurations capable of implementing communication fall within the scope of protection of the disclosure. For example, the protocol stack #B1 may also not be configured with the PDCP layer, or, the protocol stack #B1 may also not be configured with the PDCP layer and the RLC layer.

As shown in FIG. 2, a protocol stack (recorded as protocol stack #C1 hereinafter for convenient understanding and description) corresponding to a second communication protocol is configured in the network device.

The protocol stack #C1 may include, but not limited to, the following protocol layers:

an RRC layer (recorded as RRC layer #C1 hereinafter for convenient understanding and description) corresponding to the second communication protocol;

a PDCP layer (recorded as PDCP layer #C1 hereinafter for convenient understanding and description) corresponding to the second communication protocol;

an RLC layer (recorded as RLC layer #C1 hereinafter for convenient understanding and description) corresponding to the second communication protocol;

a MAC layer (recorded as MAC layer #C1 hereinafter for convenient understanding and description) corresponding to the second communication protocol; and a PHY layer (recorded as PHY layer #C1 hereinafter for convenient understanding and description) corresponding to the second communication protocol.

Moreover, as shown in FIG. 2, a protocol stack (recorded as protocol stack #D1 hereinafter for convenient understanding and description) corresponding to the second communication protocol is configured in the relay terminal device.

The protocol stack #D1 may include, but not limited to, the following protocol layers:

a PDCP layer (recorded as PDCP layer #D1 hereinafter for convenient understanding and description) corresponding to the second communication protocol;

an RLC layer (recorded as RLC layer #D1 hereinafter for convenient understanding and description) corresponding to the second communication protocol;

a MAC layer (recorded as MAC layer #D1 hereinafter for convenient understanding and description) corresponding to the second communication protocol; and a PHY layer (recorded as PHY layer #D1 hereinafter for convenient understanding and description) corresponding to the second communication protocol.

Therefore, the network device may process data processed through the protocol stack #D1 of the relay terminal device through the protocol stack #C1, and correspondingly, the relay terminal device may process data processed through the protocol stack #C1 of the network device through the protocol stack #D1.

It should be understood that the protocol layers, listed above, included in the protocol stack configured in each device are only exemplary descriptions and not intended to limit the disclosure and all other protocol layer configurations capable of implementing communication fall within the scope of protection of the disclosure. For example, the protocol stack #D1 may also not be configured with the PDCP layer, or, the protocol stack #D1 may also not be configured with the PDCP layer and the RLC layer.

It should be noted that, in the embodiment of the disclosure, data processed through the PDCP layer #B1 may be identified by the PDCP layer #D1, and moreover, data processed through the PDCP layer #D1 may be identified by the PDCP layer #B1.

Or, data processed by the RLC layer #B1 may be identified by the RLC layer #D1, and moreover, data processed by the RLC layer #D1 may be identified by the RLC layer #B1.

Therefore, the relay terminal device may convert data from the remote terminal device into data which may be identified by the network device, and moreover, the relay terminal device may convert data from the network device into data which may be identified by the remote terminal device.

In at least one embodiment, in the first manner, an ADP layer configured for format conversion processing may further be configured between the PDCP layer #B1 and PDCP layer #D1 of the relay terminal device; or, the ADP layer configured for format conversion processing may further be configured between the RLC layer #B1 and RLC layer #D1 of the relay terminal device.

In addition, exemplarily but unlimitedly, in the embodiment of the disclosure, the RRC layer #A1 may identify information from the RRC layer #C1, and moreover, the RRC layer #C1 may identify information from the RRC layer #A1.

In the first manner, for a data packet from the remote terminal device (for example, a first access-stratum data packet), the relay terminal device may perform L2 parsing (i.e., the MAC layer, the RLC layer or the PDCP layer), and moreover, for a data packet from the network device (for example, a third access-stratum data packet), the relay terminal device may perform L2 parsing (i.e., the MAC layer, the RLC layer or the PDCP layer).

A Second Manner

Figure 3:
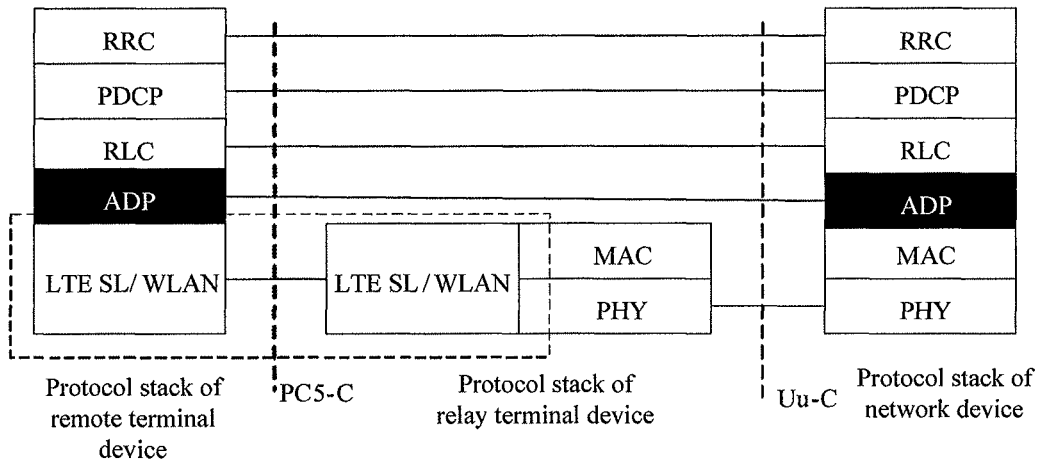
FIG. 3 is a schematic diagram of another example of a protocol stack configuration in each device according to an embodiment of the disclosure.

As shown in FIG. 3, a protocol stack (recorded as protocol stack #A2 hereinafter for convenient understanding and description) corresponding to the first communication protocol is configured in the remote terminal device.

The protocol stack #A2 may include, but not limited to, the following protocol layers:

an RRC layer (recorded as RRC layer #A2 hereinafter for convenient understanding and description) corresponding to the second communication protocol;

a PDCP layer (recorded as PDCP layer #A2 hereinafter for convenient understanding and description) corresponding to the second communication protocol;

an RLC layer (recorded as RLC layer #A2 hereinafter for convenient understanding and description) corresponding to the second communication protocol;

an ADP layer (recorded as ADP layer #A2 hereinafter for convenient understanding and description), where the ADP layer #A2 may be configured for format conversion processing between the RLC layer #A2 and an LTE/WLAN layer #A2, and moreover, the ADP layer #A2 may be configured to identify a device identifier of terminal device; and a lower protocol layer (recorded as LTE/WLAN layer #A2 hereinafter for convenient understanding and description) corresponding to the first communication protocol, where, if the D2D communication technology (i.e., the communication technology specified by the first communication protocol) is specifically the SL technology of LTE, the LTE/WLAN layer #A2 may specifically be a MAC layer and a PHY layer, and if the D2D communication technology is another communication technology, for example, the Bluetooth or WIFI technology, the LTE/WLAN layer #A2 may be a layer corresponding to the MAC layer and the PHY layer in the other communication technology.

Moreover, as shown in FIG. 3, a protocol stack (recorded as protocol stack #B2 hereinafter for convenient understanding and description) corresponding to the first communication protocol is configured in the relay terminal device.

Where, the protocol stack #B2 may include, but not limited to, the following protocol layer:

a lower protocol layer (recorded as LTE/WLAN layer #B2 hereinafter for convenient understanding and description) corresponding to the first communication protocol, where, if the D2D communication technology (i.e., the communication technology specified by the first communication protocol) is specifically the SL technology of LTE, the LTE/WLAN layer #B2 may specifically be a MAC layer and a PHY layer, and if the D2D communication technology is another communication technology, for example, the Bluetooth or WIFI technology, the LTE/WLAN layer #B2 may be a layer corresponding to the MAC layer and the PHY layer in the other communication technology.

Therefore, the remote terminal device may process data processed through the LTE/WLAN layer #B2 of the relay terminal device through the LTE/WLAN #A2, and correspondingly, the relay terminal device may process data processed through the LTE/WLAN layer #A2 of the remote terminal device through the LTE/WLAN layer #B2.

It should be understood that the protocol layers, listed above, included in the protocol stack configured in each device are only exemplary descriptions and not intended to limit the disclosure and all other protocol layer configurations capable of implementing communication fall within the scope of protection of the disclosure. For example, the protocol stack #B2 may also be configured with a PDCP layer, or, the protocol stack #B2 may also be configured with the PDCP layer and an RLC layer.

As shown in FIG. 3, a protocol stack (recorded as protocol stack #C2 hereinafter for convenient understanding and description) corresponding to the second communication protocol is configured in the network device.

The protocol stack #C2 may include, but not limited to, the following protocol layers:

an RRC layer (recorded as RRC layer #C2 hereinafter for convenient understanding and description) corresponding to the second communication protocol;

a PDCP layer (recorded as PDCP layer #C2 hereinafter for convenient understanding and description) corresponding to the second communication protocol;

an RLC layer (recorded as RLC layer #C2 hereinafter for convenient understanding and description) corresponding to the second communication protocol;

an ADP layer (recorded as ADP layer #C2 hereinafter for convenient understanding and description) corresponding to the second communication protocol, where the ADP layer #C2 may be configured to identify the device identifier of the terminal device;

a MAC layer (recorded as MAC layer #C2 hereinafter for convenient understanding and description) corresponding to the second communication protocol; and a PHY layer (recorded as PHY layer #C2 hereinafter for convenient understanding and description) corresponding to the second communication protocol.

Moreover, as shown in FIG. 3, a protocol stack (recorded as protocol stack #D2 hereinafter for convenient understanding and description) corresponding to the second communication protocol is configured in the relay terminal device.

Where, the protocol stack #D2 may include, but not limited to, the following protocol layers:

a MAC layer (recorded as MAC layer #D2 hereinafter for convenient understanding and description) corresponding to the second communication protocol; and a PHY layer (recorded as PHY layer #D2 hereinafter for convenient understanding and description) corresponding to the second communication protocol.

Therefore, the network device may process data processed through the protocol stack #D2 of the relay terminal device through the protocol stack #C2, and correspondingly, the relay terminal device may process data processed through the protocol stack #C2 of the network device through the protocol stack #D2.

It should be understood that the protocol layers, listed above, included in the protocol stack configured in each device are only exemplary descriptions and not intended to limit the disclosure and all other protocol layer configurations capable of implementing communication fall within the scope of protection of the disclosure. For example, the protocol stack #D2 may also be configured with a PDCP layer, or, the protocol stack #D2 may also be configured with the PDCP layer and an RLC layer.

It is important to note that, in the embodiment of the disclosure, data processed through the LTE/WLAN layer #B2 may be identified by the MAC layer #D2, and moreover, data processed through the MAC layer #D2 may be identified by the LTE/WLAN layer #B2.

Therefore, the relay terminal device may convert data from the remote terminal device into data which may be identified by the network device, and moreover, the relay terminal device may convert data from the network device into data which may be identified by the remote terminal device.

In addition, exemplarily but unlimitedly, in the embodiment of the disclosure, the RRC layer #A2 may identify information from the RRC layer #C2, and moreover, the RRC layer #C2 may identify information from the RRC layer #A2. The PDCP layer #A2 may identify information from the PDCP layer #C2, and moreover, the PDCP layer #C2 may identify information from the PDCP layer #A2. The RLC layer #A2 may identify information from the RLC layer #C2, and moreover, the RLC layer #C2 may identify information from the RLC layer #A2. The ADP layer #A2 may identify information from the ADP layer #C2, and moreover, the ADP layer #C2 may identify information from the ADP layer #A2.

In the second manner, for a data packet from the remote terminal device (for example, the first access-stratum data packet), the relay terminal device may perform L2 parsing (for example, the MAC layer), and moreover, for a data packet from the network device (for example, the third access-stratum data packet), the relay terminal device may perform L2 parsing (for example, the MAC layer).

A Third Manner

Figure 4:
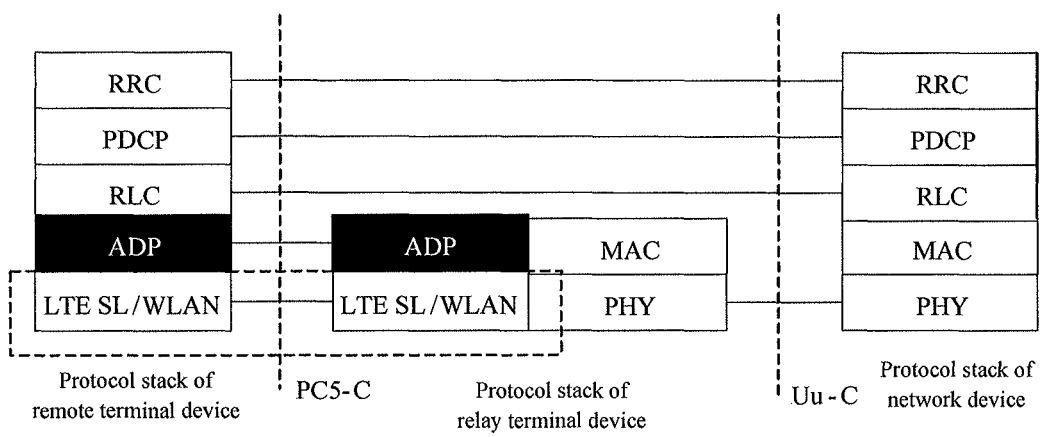
FIG. 4 is a schematic diagram of another example of a protocol stack configuration in each device according to an embodiment of the disclosure.

As shown in FIG. 4, a protocol stack (recorded as protocol stack #A3 hereinafter for convenient understanding and description) corresponding to the first communication protocol is configured in the remote terminal device.

The protocol stack #A3 may include, but not limited to, the following protocol layers:

an RRC layer (recorded as RRC layer #A3 hereinafter for convenient understanding and description) corresponding to the second communication protocol;

a PDCP layer (recorded as PDCP layer #A3 hereinafter for convenient understanding and description) corresponding to the second communication protocol;

an RLC layer (recorded as RLC layer #A3 hereinafter for convenient understanding and description) corresponding to the second communication protocol;

an ADP layer (recorded as ADP layer #A3 hereinafter for convenient understanding and description), where the ADP layer #A3 may be configured for format conversion processing between the RLC layer #A3 and an LTE/WLAN layer #A3, and moreover, the ADP layer #A3 may be configured to identify the device identifier of the terminal device; and a lower protocol layer (recorded as LTE/WLAN layer #A3 hereinafter for convenient understanding and description) corresponding to the first communication protocol, where, if the D2D communication technology (i.e., the communication technology specified by the first communication protocol) is specifically the SL technology of LTE, the LTE/WLAN layer #A3 may specifically be a MAC layer and a PHY layer, and if the D2D communication technology is another communication technology, for example, the Bluetooth or WIFI technology, the LTE/WLAN layer #A3 may be a layer corresponding to the MAC layer and the PHY layer in the other communication technology.

Moreover, as shown in FIG. 4, a protocol stack (recorded as protocol stack #B3 hereinafter for convenient understanding and description) corresponding to the first communication protocol is configured in the relay terminal device.

The protocol stack #B3 may include, but not limited to, the following protocol layer:

a lower protocol layer (recorded as LTE/WLAN layer #B3 hereinafter for convenient understanding and description) corresponding to the first communication protocol, where, if the D2D communication technology (i.e., the communication technology specified by the first communication protocol) is specifically the SL technology of LTE, the LTE/WLAN layer #B3 may specifically be a MAC layer and a PHY layer, and if the D2D communication technology is another communication technology, for example, the Bluetooth or WIFI technology, the LTE/WLAN layer #B3 may be a layer corresponding to the MAC layer and the PHY layer in the other communication technology.

Therefore, the remote terminal device may process data processed through the LTE/WLAN layer #B3 of the relay terminal device through the LTE/WLAN #A3, and correspondingly, the relay terminal device may process data processed through the LTE/WLAN layer #A3 of the remote terminal device through the LTE/WLAN layer #B3.

It should be understood that the protocol layers, listed above, included in the protocol stack configured in each device are only exemplary descriptions and not intended to limit the disclosure and all other protocol layer configurations capable of implementing communication fall within the scope of protection of the disclosure. For example, the protocol stack #B3 may also be configured with a PDCP layer, or, the protocol stack #B3 may also be configured with the PDCP layer and an RLC layer.

As shown in FIG. 4, a protocol stack (recorded as protocol stack #C3 hereinafter for convenient understanding and description) corresponding to the second communication protocol is configured in the network device.

The protocol stack #C3 may include, but not limited to, the following protocol layers:

an RRC layer (recorded as RRC layer #C3 hereinafter for convenient understanding and description) corresponding to the second communication protocol;

a PDCP layer (recorded as PDCP layer #C3 hereinafter for convenient understanding and description) corresponding to the second communication protocol;

an RLC layer (recorded as RLC layer #C3 hereinafter for convenient understanding and description) corresponding to the second communication protocol;

a MAC layer (recorded as MAC layer #C3 hereinafter for convenient understanding and description) corresponding to the second communication protocol; and a PHY layer (recorded as PHY layer #C3 hereinafter for convenient understanding and description) corresponding to the second communication protocol.

Moreover, as shown in FIG. 4, a protocol stack (recorded as protocol stack #D3 hereinafter for convenient understanding and description) corresponding to the second communication protocol is configured in the relay terminal device.

The protocol stack #D3 may include, but not limited to, the following protocol layers:

a MAC layer (recorded as MAC layer #D3 hereinafter for convenient understanding and description) corresponding to the second communication protocol; and a PHY layer (recorded as PHY layer #D3 hereinafter for convenient understanding and description) corresponding to the second communication protocol.

Therefore, the network device may process data processed through the protocol stack #D3 of the relay terminal device through the protocol stack #C3, and correspondingly, the relay terminal device may process data processed through the protocol stack #C3 of the network device through the protocol stack #D3.

It should be understood that the protocol layers, listed above, included in the protocol stack configured in each device are only exemplary descriptions and not intended to limit the disclosure and all other protocol layer configurations capable of implementing communication fall within the scope of protection of the disclosure. For example, the protocol stack #D3 may also be configured with a PDCP layer, or, the protocol stack #D3 may also be configured with the PDCP layer and an RLC layer.

It should be noted that, in the embodiment of the disclosure, an ADP layer (recorded as ADP layer #B3 hereinafter for convenient understanding and description) may further be configured between the LTE/WLAN layer #B3 and the MAC layer #D3, the ADP layer #B3 may be configured for format conversion processing between the LTE/WLAN layer #B3 and the MAC layer #D3, and moreover, the ADP layer #B3 may be configured to identify the device identifier of the terminal device. Therefore, data processed through the LTE/WLAN layer #B3 may be identified by the MAC layer #D3, and moreover, data processed through the MAC layer #D3 may be identified by the LTE/WLAN layer #B3.

Therefore, the relay terminal device may convert data from the remote terminal device into data which may be identified by the network device, and moreover, the relay terminal device may convert data from the network device into data which may be identified by the remote terminal device.

In addition, exemplarily but unlimitedly, in the embodiment of the disclosure, the RRC layer #A3 may identify information from the RRC layer #C3, and moreover, the RRC layer #C3 may identify information from the RRC layer #A3. The PDCP layer #A3 may identify information from the PDCP layer #C3, and moreover, the PDCP layer #C3 may identify information from the PDCP layer #A3. The RLC layer #A3 may identify information from the RLC layer #C3, and moreover, the RLC layer #C3 may identify information from the RLC layer #A3.

In the third manner, for a data packet from the remote terminal device (for example, the first access-stratum data packet), the relay terminal device may perform L2 parsing (for example, the MAC layer), and moreover, for a data packet from the network device (for example, the third access-stratum data packet), the relay terminal device may perform L2 parsing (for example, the MAC layer).

A Fourth Manner

Figure 5:
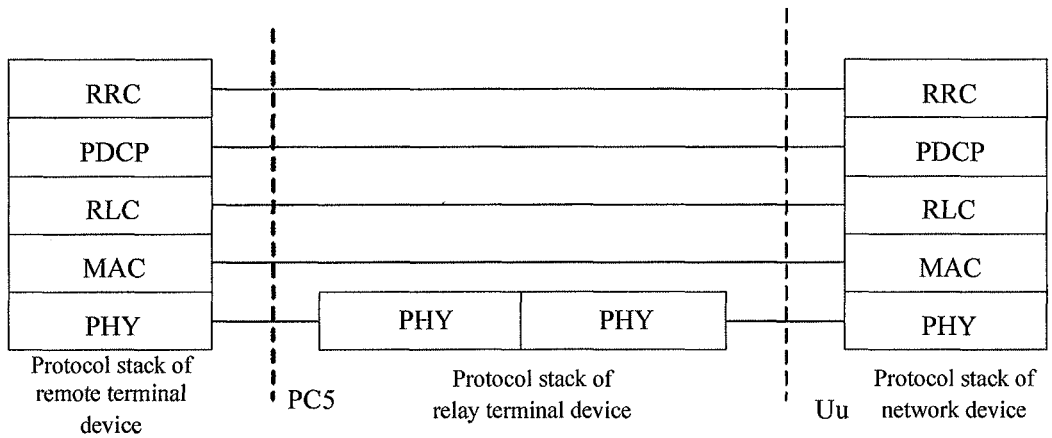
FIG. 5 is a schematic diagram of another example of a protocol stack configuration in each device according to an embodiment of the disclosure.

As shown in FIG. 5, a protocol stack (recorded as protocol stack #A4 hereinafter for convenient understanding and description) corresponding to the first communication protocol is configured in the remote terminal device.

The protocol stack #A4 may include, but not limited to, the following protocol layers:

an RRC layer (recorded as RRC layer #A4 hereinafter for convenient understanding and description) corresponding to the first communication protocol;

a PDCP layer (recorded as PDCP layer #A4 hereinafter for convenient understanding and description) corresponding to the first communication protocol;

an RLC layer (recorded as RLC layer #A4 hereinafter for convenient understanding and description) corresponding to the first communication protocol;

a MAC layer (recorded as MAC layer #A4 hereinafter for convenient understanding and description) corresponding to the first communication protocol; and a PHY layer (recorded as PHY layer #A4 hereinafter for convenient understanding and description) corresponding to the first communication protocol.

Moreover, as shown in FIG. 5, a protocol stack (recorded as protocol stack #B4 hereinafter for convenient understanding and description) corresponding to the first communication protocol is configured in the relay terminal device.

The protocol stack #B4 may include, but not limited to, the following protocol layer:

a PHY layer (recorded as PHY layer #B4 hereinafter for convenient understanding and description) corresponding to the first communication protocol.

Therefore, the remote terminal device may process data processed through the protocol stack #B4 of the relay terminal device through the protocol stack #A4, and correspondingly, the relay terminal device may process data processed through the protocol stack #A4 of the remote terminal device through the protocol stack #B4.

It should be understood that the protocol layers, listed above, included in the protocol stack configured in each device are only exemplary descriptions and not intended to limit the disclosure.

As shown in FIG. 5, a protocol stack (recorded as protocol stack #C4 hereinafter for convenient understanding and description) corresponding to the second communication protocol is configured in the network device.

The protocol stack #C4 may include, but not limited to, the following protocol layers:

an RRC layer (recorded as RRC layer #C4 hereinafter for convenient understanding and description) corresponding to the second communication protocol;

a PDCP layer (recorded as PDCP layer #C4 hereinafter for convenient understanding and description) corresponding to the second communication protocol;

an RLC layer (recorded as RLC layer #C4 hereinafter for convenient understanding and description) corresponding to the second communication protocol;

a MAC layer (recorded as MAC layer #C4 hereinafter for convenient understanding and description) corresponding to the second communication protocol; and a PHY layer (recorded as PHY layer #C4 hereinafter for convenient understanding and description) corresponding to the second communication protocol.

Moreover, as shown in FIG. 5, a protocol stack (recorded as protocol stack #D4 hereinafter for convenient understanding and description) corresponding to the second communication protocol is configured in the relay terminal device.

The protocol stack #D4 may include, but not limited to, the following protocol layer:

a PHY layer (recorded as PHY layer #D4 hereinafter for convenient understanding and description) corresponding to the second communication protocol.

Therefore, the network device may process data processed through the protocol stack #D1 of the relay terminal device through the protocol stack #C4, and correspondingly, the relay terminal device may process data processed through the protocol stack #C4 of the network device through the protocol stack #D4.

It should be understood that the protocol layers, listed above, included in the protocol stack configured in each device are only exemplary descriptions and not intended to limit the disclosure.

It should be noted that, in the embodiment of the disclosure, data processed through the PHY layer #B4 may be identified by the PHY layer #D4, and moreover, data processed through the PHY layer #D4 may be identified by the PHY layer #B4.

Therefore, the relay terminal device may convert data from the remote terminal device into data which may be identified by the network device, and moreover, the relay terminal device may convert data from the network device into data which may be identified by the remote terminal device.

It should be noted that, in the fourth manner, the first communication protocol may be the same as the second communication protocol, or, the first communication protocol may also be different from the second communication protocol. There are no special limits made in the disclosure. Moreover, in the embodiment of the disclosure, for example, under the circumstance that the first communication protocol is different from the second communication protocol, an ADP layer configured for format conversion processing may further be configured between the PHY layer #B4 and PHY layer #D4 of the relay terminal device.

In addition, exemplarily but unlimitedly, in the embodiment of the disclosure, the RRC layer #A4 may identify information from the RRC layer #C4, and moreover, the RRC layer #C4 may identify information from the RRC layer #A4. The PDCP layer #A4 may identify information from the PDCP layer #C4, and moreover, the PDCP layer #C4 may identify information from the PDCP layer #A4. The RLC layer #A4 may identify information from the RLC layer #C4, and moreover, the RLC layer #C4 may identify information from the RLC layer #A4. The MAC layer #A4 may identify information from the MAC layer #C4, and moreover, the MAC layer #C4 may identify information from the MAC layer #A4.

In the fourth manner, for a data packet from the remote terminal device (for example, a first access-stratum data packet), the relay terminal device performs Layer (L1) parsing (i.e., the PHY layer), and moreover, for a data packet from the network device (for example, a third access-stratum data packet), the relay terminal device may perform L1 parsing (i.e., the PHY layer).

In at least one embodiment, the ADP layer may be located between the MAC layer and the RLC layer and may also be located between the RLC layer and the PDCP layer, which is not limited in the embodiment of the disclosure. In the embodiment of the disclosure, the ADP layer may be configured to identify a device identifier of D2D terminal device. In at least one embodiment, the ADP layer may also be configured to identify a relay-specific LCID configured to indicate relay transmission; and in addition, in at least one embodiment, the ADP layer may be configured to convert data received from a lower layer and transmitted by adopting various D2D communication technologies into a communication technology-independent form and optionally transmit the processed data to an upper layer for further processing. In at least one embodiment, the relay-specific LCID may be configured to identify relay data. That is, in the embodiment of the disclosure, the relay data may be identified through the relay-specific LCID. However, the embodiment of the disclosure is not limited.

Exemplarily but unlimitedly, in the embodiment of the disclosure, there is at least one corresponding protocol layer (for example, protocol layers connected by a straight line between the remote terminal device and the network device in FIG. 2 to FIG. 5) in each of the protocol stack in the remote terminal device and the protocol stack in the network device, that is, the remote terminal device and the network device may identify data or information from each other through the corresponding protocol layers.

Figure 6:
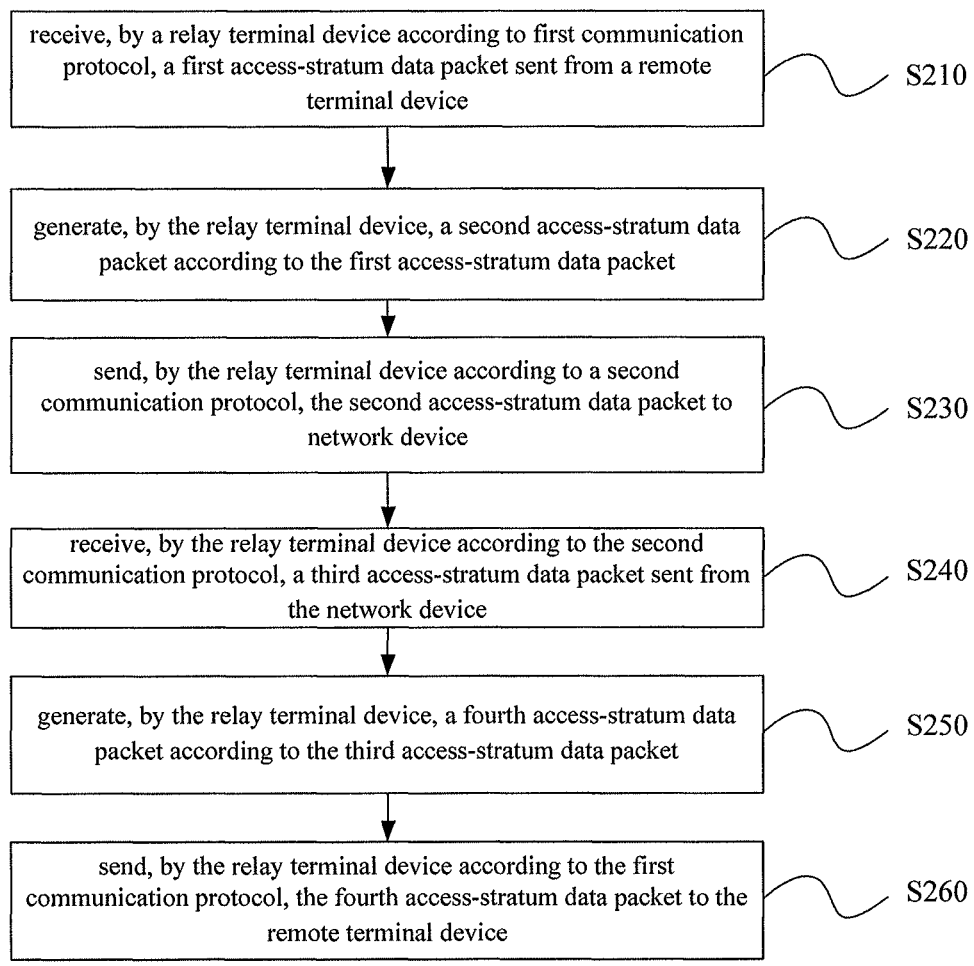
FIG. 6 is a schematic flowchart of a method for establishing a RRC connection according to an embodiment of the disclosure.

FIG. 6 is a schematic flowchart of a method 200 for establishing a RRC connection described from the angle of relay terminal device according to an embodiment of the disclosure. As shown in FIG. 6, the method 200 includes the following actions.

In S210, the relay terminal device receives a first access-stratum data packet sent from remote terminal device according to first communication protocol. The first access-stratum data packet is generated through encapsulating, by the remote terminal device, an RRC connection establishment request message to be sent to network device. The first access-stratum data packet contains a device identifier of the remote terminal device.

In S220, the relay terminal device generates a second access-stratum data packet according to the first access-stratum data packet. The second access-stratum data packet contains the device identifier of the remote terminal device.

In S230, the relay terminal device sends the second access-stratum data packet to the network device according to a second communication protocol.

In S240, the relay terminal device receives a third access-stratum data packet sent from the network device according to the second communication protocol. The third access-stratum data packet is generated through encapsulating, by the network device, an RRC connection establishment message to be sent to the remote terminal device. The RRC connection establishment message is generated by the network device according to the device identifier of the remote terminal device and the RRC connection establishment request message. The third access-stratum data packet contains the device identifier of the remote terminal device.

In S250, the relay terminal device generates a fourth access-stratum data packet according to the third access-stratum data packet. The fourth access-stratum data packet contains the device identifier of the remote terminal device.

In S260, the relay terminal device sends the fourth access-stratum data packet to the remote terminal device according to the first communication protocol.

Specifically, in the embodiment of the disclosure, when the remote terminal device is required to establish an RRC connection, the RRC connection establishment request message may be generated. Here, a method and process for generating the RRC connection establishment request message may be similar to a conventional art, and detailed descriptions about them may be omitted herein to avoid elaborations.

Then, the remote terminal device may encapsulate the RRC connection establishment request message through a protocol stack (or, a protocol layer) configured in the remote terminal device to generate a data packet #1 (i.e., an example of the first access-stratum data packet).

In at least one embodiment, the first access-stratum data packet is an L1 data packet specified by the first communication protocol, or the first access-stratum data packet is an L2 data packet specified by the first communication protocol.

Specifically, in the embodiment of the disclosure, for example, the data packet #1 may be a MAC-layer PDU, where the MAC-layer PDU may refer to that an outermost layer or highest layer of data is encapsulated in a MAC layer of the device.

Or, the data packet #1 may be a PHY-layer data packet, where the PHY-layer data packet may refer to that the outermost layer or highest layer of the data is encapsulated in a PHY layer of the device.

It should be understood that the forms, listed above, of the data packet #1 are only exemplary descriptions and not intended to limit the disclosure. For example, the data packet #1 may also be an RLC PDU or a PDCP PDU, that is, an outermost layer or highest layer of the data packet #1 is an RLC layer or a PDCP layer.

In at least one embodiment, when protocol stacks of the remote terminal device and the relay terminal device further include ADP layers, a specific form of the data packet #1 may correspond to a D2D communication technology adopted for a PC5 interface. For example, when the D2D communication technology is an SL technology of LTE, the data packet #1 transmitted by the PC5 interface may specifically be a MAC PDU, and if the D2D communication technology is a Bluetooth or WIFI technology, the data packet #1 transmitted by the PC5 interface may specifically be a data packet corresponding to the MAC PDU in the Bluetooth or WIFI technology. There are no limits made in the embodiment of the disclosure.

Moreover, the data packet #1 may contain the device identifier (or identification information) of the remote terminal device. The device identifier of the remote terminal device is configured to uniquely indicate the remote terminal device. The device identifier of the remote terminal device may be identified by the relay terminal device. For example, the relay terminal device may identify the device identifier of the remote terminal device through the MAC layer. However, the embodiment of the disclosure is not limited. The device identifier may be device information of the terminal device, for example, a telephone number.

In at least one embodiment, the device identifier of the remote terminal device may include a specific identifier of the remote terminal device. The specific identifier of the remote terminal device is configured to uniquely identify the remote terminal device during relay transmission. The specific identifier may be predefined and may also be configured by the network device. A length of the specific identifier may be smaller than a length of the terminal device identifier, so that a signaling overhead is reduced. For example, the specific identifier may be a L2 identifier, i.e., an identifier encapsulated and parsed in L2 of the device. The L2 identifier may be predefined or allocated to the remote terminal device by the network device. For example, the L2 identifier is allocated to the remote terminal device by the network device in a process of establishing a bearer for the remote terminal device. However, the embodiment of the disclosure is not limited. In at least one embodiment, the L2 identifier may be set in the PDCP layer, the RLC layer or the MAC layer, and is namely encapsulated and parsed in the PDCP layer, the RLC layer or the MAC layer.

In at least one embodiment, when L2 of each of the remote terminal device or the network device further includes an independent ADP layer, the L2 identifier may be set in the ADP layer or a corresponding layer of the D2D communication technology. For example, when the SL technology is adopted for the PC5 interface between the relay terminal device and the remote terminal device, the L2 identifier may be set in the MAC layer. However, there are no limits made in the embodiment of the disclosure.

When each of the remote terminal device or the network device has the independent ADP layer and the ADP encapsulates and parses the device identifier of the remote terminal device. When the remote terminal device or the network device has data to be sent, the data may be sequentially encapsulated through the PDCP layer, the RLC layer and the ADP layer. The identification information (for example, the L2 identifier) of the remote terminal device may be contained in the ADP layer, but the embodiment of the disclosure is not limited. In at least one embodiment, the remote terminal device and the network device have no independent ADP layer and the identification information of the remote terminal device is parsed and encapsulated in the MC layer, when the remote terminal device or the network device has data to be sent, for example, the network device receives data of the remote terminal device on a network side, the data may be sequentially encapsulated through the PDCP layer, the RLC layer and the MAC layer, where the device identifier (for example, the L2 identifier) of the remote terminal device may be contained in the MAC layer, but the embodiment of the disclosure is not limited.

Then, the remote terminal device may send the data packet #1 to the relay terminal device through, for example, the PC5 interface.

In the embodiment of the disclosure, the data packet #1 is a data packet consistent with a communication rule (i.e., a first communication protocol rule) between the remote terminal device and the relay terminal device. Therefore, the relay terminal device may receive the data packet #1, and moreover, may encapsulate the data packet #1 based on a communication rule (i.e., a second communication protocol rule) between the relay terminal device and the network device to generate a data packet consistent with the second communication protocol rule (i.e., an example of the second access-stratum data packet, recorded as data packet #2 hereinafter for convenient understanding and description).

In at least one embodiment, the second access-stratum data packet is an L1 data packet specified by the second communication protocol.

Or, the second access-stratum data packet is an L2 data packet specified by the second communication protocol.

Specifically, in the embodiment of the disclosure, for example, the data packet #2 may be a MAC-layer PDU, where the MAC-layer PDU may refer to that an outermost layer or highest layer of data is encapsulated in the MAC layer of the device.

Or, the data packet #2 may be a PHY-layer data packet, where the PHY-layer data packet may refer to that the outermost layer or highest layer of the data is encapsulated in the PHY layer of the device.

It should be understood that the forms, listed above, of the data packet #2 are only exemplary descriptions and not intended to limit the disclosure. For example, the data packet #2 may also be an RLC PDU or a PDCP PDU, that is, an outermost layer or highest layer of the data packet #2 is the RLC layer or the PDCP layer.

Moreover, the data packet #2 may contain the device identifier (or the identification information) of the remote terminal device.

Then, the relay terminal device may send the data packet #2 to the network device through, for example, a Uu interface.

In the embodiment of the disclosure, the data packet #2 is a data packet consistent with the communication rule (i.e., the second communication protocol rule) between the relay terminal device and the network device. Therefore, the network device may receive the data packet #2, and moreover, may decapsulate the data packet #2 based on the communication rule (i.e., the second communication protocol rule) between the relay terminal device and the network device to acquire the device identifier of the remote terminal device and an RRC connection establishment request.

Furthermore, the network device may determine the remote terminal device based on the device identifier of the remote terminal device and establish the RRC connection for the remote terminal device based on the RRC connection establishment request. Moreover, the network device may generate an RRC connection establishment message configured to bear related information of the RRC connection.

Here, a process through which the network device establishes the RRC connection and generates the RRC connection establishment message may be similar to the conventional art, and detailed descriptions about it may be omitted to avoid elaborations.

Then, the network device may encapsulate the RRC connection establishment message through a protocol stack (or a protocol layer) configured in the network device to generate a data packet #3 (i.e., an example of the third access-stratum data packet).

In at least one embodiment, the third access-stratum data packet is an L1 data packet specified by the second communication protocol.

Or, the third access-stratum data packet is an L2 data packet specified by the second communication protocol.

Specifically, in the embodiment of the disclosure, for example, the data packet #3 may be a MAC-layer PDU, where the MAC-layer PDU may refer to that an outermost layer or highest layer of data is encapsulated in the MAC layer of the device.

Or, the data packet #3 may be a PHY-layer data packet, where the PHY-layer data packet may refer to that the outermost layer or highest layer of the data is encapsulated in the PHY layer of the device.

It should be understood that the forms, listed above, of the data packet #3 are only exemplary descriptions and not intended to limit the disclosure. For example, the data packet #3 may also be an RLC PDU or a PDCP PDU, that is, an outermost layer or highest layer of the data packet #3 is the RLC layer or the PDCP layer.

Moreover, the data packet #3 may contain the device identifier (or the identification information) of the remote terminal device.

Then, the network device may send the data packet #3 to the relay terminal device through, for example, the Uu interface.

In the embodiment of the disclosure, the data packet #3 is a data packet consistent with the communication rule (i.e., the second communication protocol rule) between the network device and the relay terminal device. Therefore, the relay terminal device may receive the data packet #3, and moreover, may encapsulate the data packet #3 based on the communication rule (i.e., the first communication protocol rule) between the relay terminal device and the remote terminal device to generate a data packet consistent with the first communication protocol rule (i.e., an example of the fourth access-stratum data packet, recorded as data packet #4 hereinafter for convenient understanding and description).

In at least one embodiment, the fourth access-stratum data packet is an L1 data packet specified by the first communication protocol.

Or, the fourth access-stratum data packet is an L2 data packet specified by the first communication protocol.

Specifically, in the embodiment of the disclosure, for example, the data packet #4 may be a MAC-layer PDU, where the MAC-layer PDU may refer to that an outermost layer or highest layer of data is encapsulated in the MAC layer of the device.

Or, the data packet #4 may be a PHY-layer data packet, where the PHY-layer data packet may refer to that the outermost layer or highest layer of the data is encapsulated in the PHY layer of the device.

It should be understood that the forms, listed above, of the data packet #4 are only exemplary descriptions and not intended to limit the disclosure. For example, the data packet #4 may also be an RLC PDU or a PDCP PDU, that is, an outermost layer or highest layer of the data packet #4 is the RLC layer or the PDCP layer.

In at least one embodiment, when the protocol stacks of the remote terminal device and the relay terminal device further include the ADP layers, a specific form of the data packet #4 may correspond to the D2D communication technology adopted for the PC5 interface. For example, when the D2D communication technology is the SL technology of LTE, the data packet #4 transmitted by the PC5 interface may specifically be a MAC PDU. When the D2D communication technology is the Bluetooth or WIFI technology, the data packet #4 transmitted by the PC5 interface may specifically be a data packet corresponding to the MAC PDU in the Bluetooth or WIFI technology. There are no limits made in the embodiment of the disclosure.

Moreover, the data packet #4 may contain the device identifier (or the identification information) of the remote terminal device.

Then, the relay terminal device may send the data packet #4 to the remote terminal device through, for example, the PC5 interface. In the embodiment of the disclosure, the data packet #4 is a data packet consistent with the communication rule (i.e., the first communication protocol rule) between the relay terminal device and the remote terminal device. Therefore, the remote terminal device may receive the data packet #4, and moreover, may decapsulate the data packet #4 based on the protocol stack in the remote terminal device to acquire the device identifier of the remote terminal device and the RRC connection establishment message.

Furthermore, the remote terminal device may determine that the network device establishes the RRC connection for the remote terminal device according to the device identifier of the remote terminal device and the RRC connection establishment message.

In at least one embodiment, the method further includes the following actions.

The relay terminal device receives a fifth access-stratum data packet sent from the remote terminal device according to the first communication protocol. The fifth access-stratum data packet is generated through encapsulating, by the remote terminal device, an RRC connection establishment completed message to be sent to the network device. The fifth access-stratum data packet contains the device identifier of the remote terminal device. The RRC connection establishment completed message is generated by the remote terminal device according to the device identifier of the remote terminal device and the RRC connection establishment message.

The relay terminal device generates a sixth access-stratum data packet according to the fifth access-stratum data packet. The sixth access-stratum data packet contains the device identifier of the remote terminal device.

The relay terminal device sends the sixth access-stratum data packet to the network device according to the second communication protocol.

Specifically, after the remote terminal device may determine that the network device establishes the RRC connection for the remote terminal device according to the device identifier of the remote terminal device and the RRC connection establishment message, the remote terminal device may generate the RRC connection establishment completed message. Here, a process through which the remote terminal device generates the RRC connection establishment completed message is similar to the conventional art, and detailed descriptions about it are omitted to avoid elaborations.

Then, the remote terminal device may encapsulate the RRC connection establishment completed message through the protocol stack (or the protocol layer) configured in the remote terminal device to generate a data packet #5 (i.e., an example of the fifth access-stratum data packet).

In at least one embodiment, the fifth access-stratum data packet is an L1 data packet specified by the first communication protocol.

Or, the fifth access-stratum data packet is an L2 data packet specified by the first communication protocol.

Specifically, in the embodiment of the disclosure, for example, the data packet #5 may be a MAC-layer PDU, where the MAC-layer PDU may refer to that an outermost layer or highest layer of data is encapsulated in the MAC layer of the device.

Or, the data packet #5 may be a PHY-layer data packet, where the PHY-layer data packet may refer to that the outermost layer or highest layer of the data is encapsulated in the PHY layer of the device.

It should be understood that the forms, listed above, of the data packet #5 are only exemplary descriptions and not intended to limit the disclosure. For example, the data packet #5 may also be an RLC PDU or a PDCP PDU, that is, an outermost layer or highest layer of the data packet #2 is the RLC layer or the PDCP layer.

In at least one embodiment, when the protocol stacks of the remote terminal device and the relay terminal device further include the ADP layers, a specific form of the data packet #5 may correspond to the D2D communication technology adopted for the PC5 interface. For example, when the D2D communication technology is the SL technology of LTE, the data packet #5 transmitted by the PC5 interface may specifically be a MAC PDU, and when the D2D communication technology is the Bluetooth or WIFI technology, the data packet #5 transmitted by the PC5 interface may specifically be a data packet corresponding to the MAC PDU in the Bluetooth or WIFI technology. There are no limits made in the embodiment of the disclosure.

Moreover, the data packet #5 may contain the device identifier (or the identification information) of the remote terminal device.

Then, the remote terminal device may send the data packet #5 to the relay terminal device through, for example, the PC5 interface.

In the embodiment of the disclosure, the data packet #5 is a data packet consistent with the communication rule (i.e., the first communication protocol rule) between the remote terminal device and the relay terminal device. Therefore, the relay terminal device may receive the data packet #5, and moreover, may encapsulate the data packet #5 based on the communication rule (i.e., the second communication protocol rule) between the relay terminal device and the network device to generate a data packet consistent with the second communication protocol rule (i.e., an example of the sixth access-stratum data packet, recorded as data packet #6 hereinafter for convenient understanding and description).

In at least one embodiment, the sixth access-stratum data packet is an L1 data packet specified by the second communication protocol.

Or, the sixth access-stratum data packet is an L2 data packet specified by the second communication protocol.

Specifically, in the embodiment of the disclosure, for example, the data packet #6 may be a MAC-layer PDU, where the MAC-layer PDU may refer to that an outermost layer or highest layer of data is encapsulated in the MAC layer of the device.

Or, the data packet #6 may be a PHY-layer data packet, where the PHY-layer data packet may refer to that the outermost layer or highest layer of the data is encapsulated in the PHY layer of the device.

It should be understood that the forms, listed above, of the data packet #6 are only exemplary descriptions and not intended to limit the disclosure. For example, the data packet #6 may also be an RLC PDU or a PDCP PDU, that is, an outermost layer or highest layer of the data packet #2 is the RLC layer or the PDCP layer.

Moreover, the data packet #6 may contain the device identifier (or the identification information) of the remote terminal device.

Then, the relay terminal device may send the data packet #6 to the network device through, for example, the Uu interface.

In the embodiment of the disclosure, the data packet #6 is a data packet consistent with the communication rule (i.e., the second communication protocol rule) between the relay terminal device and the network device. Therefore, the network device may receive the data packet #6, and moreover, may decapsulate the data packet #6 based on the communication rule (i.e., the second communication protocol rule) between the relay terminal device and the network device to acquire the device identifier of the remote terminal device and the RRC connection establishment completed message.

Furthermore, the network device may determine the remote terminal device based on the device identifier of the remote terminal device and determine that setup of the RRC connection is completed based on the RRC connection establishment completed message.

A transmission manner for the device identifier of the remote terminal device in the embodiment of the disclosure will be described below.

Exemplarily but unlimitedly, in the embodiment of the disclosure, the device identifier of the remote terminal device may be transmitted in the following manners.

Manner a

In at least one embodiment, the device identifier of the remote terminal device is encapsulated in the first access-stratum data packet by the remote terminal device in L2, the device identifier of the remote terminal device is encapsulated in the third access-stratum data packet by the network device in L2.

The method further includes the following actions.

The relay terminal device acquires the device identifier of the remote terminal device from the first access-stratum data packet in L2.

The relay terminal device encapsulates the device identifier of the remote terminal device in the second access-stratum data packet in L2.

The relay terminal device acquires the device identifier of the remote terminal device from the third access-stratum data packet in L2.

The relay terminal device encapsulates the device identifier of the remote terminal device in the fourth access-stratum data packet in L2.

Specifically, for example, when the protocol stacks in the remote terminal device, the relay terminal device and the network device are configured in the manner shown in FIG. 2, the relay terminal device is configured to L2 (for example, the MAC layer, the RLC layer or the PDCP layer), that is, the relay terminal device may perform L2 parsing on the received data packet.

Therefore, the remote device may add the device identifier of the remote terminal device into the data packet #1 in L2 (for example, the MAC layer, the RLC layer or the PDCP layer).

The relay terminal device may perform L2 detection on the data packet #1, thereby acquiring the device identifier of the remote terminal device.

Moreover, the relay terminal device may encapsulate the device identifier of the remote terminal device in the data packet #2 in L2 (for example, the MAC layer, the RLC layer or the PDCP layer).

The network device may perform L2 detection on the data packet #2, thereby acquiring the device identifier of the remote terminal device.

Similarly, the network device may add the device identifier of the remote terminal device into the data packet #3 in L2 (for example, the MAC layer, the RLC layer or the PDCP layer).

The relay terminal device may perform L2 detection on the data packet #3, thereby acquiring the device identifier of the remote terminal device.

Moreover, the relay terminal device may encapsulate the device identifier of the remote terminal device in the data packet #4 in L2 (for example, the MAC layer, the RLC layer or the PDCP layer).

The remote terminal device may perform L2 detection on the data packet #4, thereby acquiring the device identifier of the remote terminal device.

Furthermore, the remote device may add the device identifier of the remote terminal device into the data packet #5 in L2 (for example, the MAC layer, the RLC layer or the PDCP layer).

The relay terminal device may perform L2 detection on the data packet #5, thereby acquiring the device identifier of the remote terminal device.

Moreover, the relay terminal device may encapsulate the device identifier of the remote terminal device in the data packet #6 in L2 (for example, the MAC layer, the RLC layer or the PDCP layer).

The network device may perform L2 detection on the data packet #6, thereby acquiring the device identifier of the remote terminal device.

Manner b

In at least one embodiment, the device identifier of the remote terminal device is encapsulated in the first access-stratum data packet by the remote terminal device in the ADP layer, and the device identifier of the remote terminal device is encapsulated in the third access-stratum data packet by the network device in the ADP layer.

Specifically, for example, when the protocol stacks in the remote terminal device, the relay terminal device and the network device are configured in the manner shown in FIG. 3, the remote terminal device and the network device are configured with the ADP layers.

Therefore, the remote device may add the device identifier of the remote terminal device into the data packet #1 in the ADP layer.

At this point, the relay terminal device configured with no ADP layer may, for example, directly encapsulate the data packet #1 containing the device identifier of the remote terminal device to generate the data packet #2.

The network device may perform ADP layer detection on the data packet #2, thereby acquiring the device identifier of the remote terminal device.

Similarly, the network device may add the device identifier of the remote terminal device into the data packet #3 in the ADP layer.

At this point, the relay terminal device configured with no ADP layer may, for example, directly encapsulate the data packet #3 containing the device identifier of the remote terminal device to generate the data packet #4.

The remote terminal device may perform ADP layer detection on the data packet #4, thereby acquiring the device identifier of the remote terminal device.

Furthermore, the remote device may add the device identifier of the remote terminal device into the data packet #5 in the ADP layer.

At this point, the relay terminal device configured with no ADP layer may, for example, directly encapsulate the data packet #5 containing the device identifier of the remote terminal device to generate the data packet #6.

The network device may perform ADP layer detection on the data packet #6, thereby acquiring the device identifier of the remote terminal device.

Manner c

The device identifier of the remote terminal device is encapsulated in the first access-stratum data packet by the remote terminal device in the ADP layer, the device identifier of the remote terminal device is encapsulated in the third access-stratum data packet by the network device in L2.

The method further includes the following actions.

The relay terminal device acquires the device identifier of the remote terminal device from the first access-stratum data packet in the ADP layer.

The relay terminal device encapsulates the device identifier of the remote terminal device in the second access-stratum data packet in L2.

The relay terminal device acquires the device identifier of the remote terminal device from the third access-stratum data packet in L2.

The relay terminal device encapsulates the device identifier of the remote terminal device in the fourth access-stratum data packet in the ADP layer.

Specifically, for example, when the protocol stacks in the remote terminal device, the relay terminal device and the network device are configured in the manner shown in FIG. 4, the remote terminal device and the relay terminal device are configured with the ADP layers, that is the relay terminal device may perform ADP layer parsing on the received data packet.

Therefore, the remote device may add the device identifier of the remote terminal device into the data packet #1 in the ADP layer.

The relay terminal device may perform ADP layer detection on the data packet #1, thereby acquiring the device identifier of the remote terminal device.

Moreover, the relay terminal device may encapsulate the device identifier of the remote terminal device in the data packet #2 in L2 (for example, the MAC layer, the RLC layer or the PDCP layer).

The network device may perform L2 detection on the data packet #2, thereby acquiring the device identifier of the remote terminal device.

Similarly, the network device may add the device identifier of the remote terminal device into the data packet #3 in L2 (for example, the MAC layer, the RLC layer or the PDCP layer).

The relay terminal device may perform L2 detection on the data packet #3, thereby acquiring the device identifier of the remote terminal device.

Moreover, the relay terminal device may encapsulate the device identifier of the remote terminal device in the data packet #4 in the ADP layer.

The remote terminal device may perform ADP layer detection on the data packet #4, thereby acquiring the device identifier of the remote terminal device.

Furthermore, the remote device may add the device identifier of the remote terminal device into the data packet #5 in the ADP layer (for example, the MAC layer, the RLC layer or the PDCP layer).

The relay terminal device may perform ADP layer detection on the data packet #5, thereby acquiring the device identifier of the remote terminal device.

Moreover, the relay terminal device may encapsulate the device identifier of the remote terminal device in the data packet #6 in L2 (for example, the MAC layer, the RLC layer or the PDCP layer).

The network device may perform L2 detection on the data packet #6, thereby acquiring the device identifier of the remote terminal device.

Manner d

In at least one embodiment, the device identifier of the remote terminal device may be encapsulated in the first access-stratum data packet by the remote terminal device in an RRC layer, and the device identifier of the remote terminal device may be encapsulated in the third access-stratum data packet by the network device in an RRC layer.

Specifically, for example, when the protocol stacks in the remote terminal device, the relay terminal device and the network device are configured in the manner shown in FIG. 5, the remote terminal device and the network device are configured with the RRC layers. The relay device is not configured with an RRC layer and may not perform RRC layer parsing on the received data packet.

Therefore, the remote device may add the device identifier of the remote terminal device into the data packet #1 in the RRC layer.

At this point, the relay terminal device configured with no RRC layer may, for example, directly encapsulate the data packet #1 containing the device identifier of the remote terminal device to generate the data packet #2.

The network device may perform RRC layer detection on the data packet #2, thereby acquiring the device identifier of the remote terminal device.

Similarly, the network device may add the device identifier of the remote terminal device into the data packet #3 in the RRC layer.

At this point, the relay terminal device configured with no RRC layer may, for example, directly encapsulate the data packet #3 containing the device identifier of the remote terminal device to generate the data packet #4.

The remote terminal device may perform RRC layer detection on the data packet #4, thereby acquiring the device identifier of the remote terminal device.

Furthermore, the remote device may add the device identifier of the remote terminal device into the data packet #5 in the RRC layer.

At this point, the relay terminal device configured with no RRC layer may, for example, directly encapsulate the data packet #5 containing the device identifier of the remote terminal device to generate the data packet #6.

The network device may perform RRC layer detection on the data packet #6, thereby acquiring the device identifier of the remote terminal device.

In the embodiment of the disclosure, an LCID field (or a bearer identifier field) may further be contained in the data packets transmitted among the remote terminal device, the relay terminal device and the network device.

Exemplarily but unlimitedly, in the embodiment of the disclosure, LCIDs may be added in the following manners.

Manner X

In manner X, the relay terminal device may acquire an LCID added into the data packet #1 by the remote terminal device.

Therefore, in the embodiment of the disclosure, the method further includes the following actions.

The relay terminal device acquires a first LCID from the first access-stratum data packet, where the first LCID is determined by the remote terminal device according to a first bearer.

The relay terminal device determines a second LCID according to the first LCID, where the network device may determine the first bearer according to the second LCID.

The relay terminal device encapsulates the second LCID in the second access-stratum data packet.

Specifically, in the embodiment of the disclosure, the remote terminal device may determine the LCID to be added into the data packet #1 (i.e., an example of the first LCID, recorded as LCID #1 hereinafter for convenient understanding and distinction) according to a preset rule (i.e., an example of a first preset rule or a third preset rule, recorded as preset rule #1 hereinafter for convenient understanding and distinction) or an indication of the network device.

An example of the preset rule #1 is shown in Table 1.

TABLE 1

| LCID value | Bearer |
| --- | --- |
| 00000 | Common Control Channel (CCCH) |
| 01011 | Relay CCCH, for example, SRB0 |
| 01100 | Relay Dedicated Control Channel (DCCH), for example, SRB1 |
| 01101 | Relay DCCH, for example, SRB2 |
| 01110 | Relay Dedicated Traffic Channel (DTCH), for example, DRB1 |
| 01111 | Relay DTCH, for example, DRB2 |
| . . . | . . . |
| xxxxx-10111 | Reserved |

It should be understood that a mapping relationship, listed above, between bearers and LCIDs in Table 1 is only an exemplary description and not intended to limit the disclosure.

Moreover, in the embodiment of the disclosure, the LCID #1 may indicate a logical channel used by the remote terminal device to process the data packet #1 in L2 (specifically, the MAC layer), and moreover, the LCID #1 may indicate a bearer (i.e., an example of the first bearer, recorded as bearer #1 hereinafter for convenient understanding and distinction) used by the remote terminal device to process (or, transmit) the data packet #1.

In at least one embodiment, the action that the relay terminal device determines the second LCID according to the first LCID includes the following actions.

When the first LCID is allocated to the remote terminal device by the network device, the relay terminal device determines the first LCID to be the second LCID.

Specifically, in the embodiment of the disclosure, under the circumstance that the LCID #1 is allocated to the remote terminal device by the network device (for example, through RRC signaling forwarded by the relay terminal device), the relay terminal device may directly encapsulate the LCID #1 (i.e., an example of the second LCID) in the data packet #2, so that the network device may determine the bearer corresponding to the data packet #2 according to the LCID #1 after receiving the data packet #2.

Or, in at least one embodiment, the action that the relay terminal device determines the second LCID according to the first LCID includes the following actions.

When the first LCID is determined by the remote terminal device based on first preset rule stored in the remote terminal device, the relay terminal device determines an LCID corresponding to the first bearer under a second preset rule to be the second LCID, the first LCID corresponds to the first bearer under the first preset rule, the second preset rule is stored in the network device.

Specifically, under the circumstance that the LCID #1 is determined by the remote terminal device according to the preset rule #1, the relay terminal device may determine the bearer (i.e., the bearer #1) corresponding to the LCID #1 according to the preset rule #1, and moreover, may determine an LCID (i.e., another example of the second LCID, recorded as LCID #2 hereinafter for convenient understanding and distinction) corresponding to the bearer #1 under a preset rule #2 (i.e., an example of the second preset rule).

It should be noted that, in the embodiment of the disclosure, the preset rule #2 is a preset rule stored in the network device, and moreover, the network device determines a corresponding relationship between each bearer and each LCID according to the preset rule #2.

An example of the preset rule #1 is shown in Table 2.

TABLE 2

| LCID value | Bearer |
| --- | --- |
| 00000 | CCCH |
| 01011 | Relay CCCH (SRB0) |
| 01100 | Relay DCCH (SRB1) |
| 01101 | Relay DCCH (SRB2) |
| 01110 | Relay DTCH (DRB1) |
| 01111 | Relay DTCH (DRB2) |
| . . . | . . . |
| xxxxx-10111 | Reserved |

It should be noted that a mapping relationship, listed above, between the bearers and the LCIDs in Table 2 is only an exemplary description and not intended to limit the disclosure.

Under this circumstance, the relay terminal device may encapsulate the LCID #2 in the data packet #2, so that the network device may find the bearer (i.e., the bearer #1) corresponding to the LCID #2 from Table 2 according to the LCID #2 after receiving the data packet #2.

In a similar manner, the relay terminal device may determine an LCID added into the data packet #4, that is, the method further includes the following actions.

The relay terminal device acquires a fourth LCID from the third access-stratum data packet, where the fourth LCID is determined by the network device according to a second bearer.

The relay terminal device determines a fifth LCID according to the fourth LCID, where the remote terminal device may determine the second bearer according to the fifth LCID.

The relay terminal device encapsulates the fifth LCID in the fourth access-stratum data packet.

In at least one embodiment, the action that the relay terminal device determines the fifth LCID according to the fourth LCID includes the following actions.

When the fourth LCID is allocated to the remote terminal device by the network device, the relay terminal device determines the fourth LCID to be the fifth LCID.

When the fourth LCID is determined by the network device based on fourth preset rule stored in the network device, the relay terminal device determines an LCID corresponding to the second bearer under a fifth preset rule to be the fifth LCID, where the fourth LCID corresponds to the second bearer under the fourth preset rule, the fifth preset rule may be stored in the remote terminal device.

Manner Y

In at least one embodiment, the ADP layers are configured in the network device and the remote terminal device, the first access-stratum data packet contains a third LCID, the third LCID is allocated to the remote terminal device by the network device, or the third LCID is determined by the remote terminal device based on third preset rule stored in the remote terminal device and the network device, the third LCID is encapsulated in the first access-stratum data packet by the remote terminal device in the ADP layer.

The method further includes the following actions.

The relay terminal device encapsulates a preset LCID in the second access-stratum data packet, where the preset LCID is configured to indicate that the second access-stratum data packet is relay data to enable the network device to acquire the third LCID in the ADP layer according to the preset LCID.

Specifically, in the embodiment of the disclosure, when the ADP layers are set in the remote terminal device and the network device, no ADP layer is configured in the relay terminal device, and moreover, the LCID (the LCID #1) of the data packet #1 is added into the data packet #1 by the remote terminal device in the ADP layer, since no ADP layer is configured in the relay terminal device, the relay terminal device may not acquire the LCID #1.

Moreover, in the embodiment of the disclosure, the preset LCID (recorded as LCID #0) configured to indicate the relay data may be specified in a manner of presetting, negotiation or the like, and moreover, it may be specified that the network device and the remote terminal device are required to transmit the data to the ADP layers when detecting the LCID #0 and acquire the LCID of the data in the ADP layer.

Therefore, under this circumstance, the relay terminal device may determine the LCID #0 as the LCID added into the data packet #2.

Furthermore, after the network device receives the data packet #2 and detects that the data packet #2 contains the LCID #0, the network device may determine that the data packet #2 is the relay data, and moreover, process the data packet #2 in the ADP layer, thereby obtaining the LCID #1.

In a similar manner, the relay terminal device may determine the LCID added into the data packet #4, that is:

the ADP layers are configured in the network device and the remote terminal device, the third access-stratum data packet contains a sixth LCID, the sixth LCID is allocated to the remote terminal device by the network device, or the sixth LCID is determined by the remote terminal device based on sixth preset rule stored in the remote terminal device and the network device, the sixth LCID is encapsulated in the third access-stratum data packet by the network device in the ADP layer.

The method further includes the following actions.

The relay terminal device encapsulates the preset LCID in the fourth access-stratum data packet, where the preset LCID is configured to indicate that the fourth access-stratum data packet is the relay data to enable the remote terminal device to acquire the sixth LCID in the ADP layer according to the preset LCID.

According to the method for establishing a RRC connection of the embodiment of the disclosure, the LCIDs may be added into the data packets in the abovementioned manners to enable the network device and the remote terminal device to process the data packets by virtue of the same bearers, so that data processing accuracy may be ensured, and transmission reliability may be improved.

In at least one embodiment, before the action that the relay terminal device generates the fourth access-stratum data packet according to the third access-stratum data packet, the method further includes the following actions.

The relay terminal device determines that the third access-stratum data packet contains a specific LCID or a specific RNTI, the specific LCID being configured to indicate that the third access-stratum data packet is the relay data and the specific RNTI being configured to indicate that the third access-stratum data packet is the relay data.

Specifically, in the embodiment of the disclosure, the specific LCID may be determined in a manner of specifying by a communication protocol, negotiation or the like, and when a data packet contains the specific LCID, its receiver device may identify that the data packet is relay data and namely is required to be sent to the other device.

Therefore, the network device may encapsulate the specific LCID in the third access-stratum data packet. Exemplarily but unlimitedly, the network device may encapsulate the specific LCID in the third access-stratum data packet in L2 (for example, the MAC layer), so that the relay terminal device configured with L2 may acquire the specific LCID from the third access-stratum data packet in L2 and further determine that the data in the third access-stratum data packet is required to be sent to the remote terminal device.

Or, in the embodiment of the disclosure, the RNTI, for example, a specific Cell-Radio Network Temporary Identifier (C-RNTI), may be determined in the manner of specifying by the communication protocol, negotiation or the like, and when a data packet contains the specific RNTI (for example, the specific C-RNTI), its receiver device may identify that the data packet is relay data and namely is required to be sent to the other device.

Therefore, the network device may encapsulate the specific RNTI in the third access-stratum data packet. Exemplarily but unlimitedly, the network device may encapsulate the specific RNTI in the third access-stratum data packet in L1 (for example, the PHY layer), so that the relay terminal device may acquire the specific RNTI from the third access-stratum data packet in L1 (for example, the PHY layer) and further determine that the data in the third access-stratum data packet is required to be sent to the remote terminal device.

According to the method for establishing a RRC connection of the embodiment of the disclosure, the network device may be enabled to encapsulate the specific LCID or the specific RNTI in the third access-stratum data packet to enable the relay terminal device to determine that the third access-stratum data packet bears the relay data to be sent to the remote terminal device according to the specific LCID or the specific RNTI, so that communication reliability may be further improved.

In at least one embodiment, the method further includes the following actions.

The relay terminal device encapsulates the specific LCID or the specific RNTI in the second access-stratum data packet.

Specifically, in the embodiment of the disclosure, the specific LCID may be determined in the manner of specifying by the communication protocol, negotiation or the like, and when a data packet contains the specific LCID, its receiver device may identify that the data packet is relay data and namely is required to be sent to the other device.

Therefore, the relay terminal device may encapsulate the specific LCID in the second access-stratum data packet. Exemplarily but unlimitedly, the relay terminal device may encapsulate the specific LCID in the second access-stratum data packet in L2 (for example, the MAC layer), so that the network device may acquire the specific LCID in L2 after receiving the second access-stratum data packet and further determine that the data in the second access-stratum data packet is relay data (i.e., data sent from the remote terminal device).

Or, in the embodiment of the disclosure, the RNTI, for example, a specific C-RNTI, may be determined in the manner of specifying by the communication protocol, negotiation or the like, and when a data packet contains the specific RNTI (for example, the specific C-RNTI), its receiver device may identify that the data packet is relay data and namely is required to be sent to the other device.

Therefore, the relay terminal device may encapsulate the specific RNTI in the second access-stratum data packet. Exemplarily but unlimitedly, the relay terminal device may encapsulate the specific RNTI in the second access-stratum data packet in L1 (for example, the PHY layer), so that the network device may acquire the specific RNTI from the second access-stratum data packet in L 1 (for example, the PHY layer) and further determine that the data in the second access-stratum data packet is the relay data (i.e., the data sent from the remote terminal device).

According to method for establishing a RRC connection of the embodiment of the disclosure, the relay terminal device may be enabled to encapsulate the specific LCID or the specific RNTI in the second access-stratum data packet to make it easy for the network device to determine that the second access-stratum data packet is the relay data, so that the processing efficiency may be improved, and the communication reliability may be improved.

Exemplarily but unlimitedly, in the embodiment of the disclosure, the relay terminal device may send the data packet #2 to the network device in the following manners, that is:

in at least one embodiment, the action that the relay terminal device sends the second access-stratum data packet to the network device according to the second communication protocol includes the following actions.

The relay terminal device acquires first mapping relationship information, the first mapping relationship information being configured to indicate a one-to-one mapping relationship between multiple data volume intervals and multiple uplink channels, where each of the data volume intervals includes at least one data volume.

The relay terminal device determines a first uplink channel according to a data volume interval to which a data volume of the second access-stratum data packet belongs and the first mapping relationship information, where the first uplink channel corresponds to the data volume interval to which the data volume of the second access-stratum data packet belongs.

The relay terminal device sends a resource request message to the network device through the first uplink channel.

The relay terminal device receives first scheduling information sent from the network device, the first scheduling information being configured to indicate a first transmission resource and a magnitude of the first transmission resource being determined by the network device according to the first uplink channel and the first mapping relationship information.

The relay terminal device sends the second access-stratum data packet to the network device through the first transmission resource according to the second communication protocol.

Specifically, the relay terminal device may decode the corresponding data (i.e., the data packet #1) according to a specific modulation level on the PC5 interface, and moreover, may generate the data packet #2 according to the data packet #1.

Moreover, the relay terminal device may select a specific (for example, determined according to the first mapping relationship) Physical Uplink Control Channel (PUCCH) resource (i.e., an example of the first uplink channel) to send the resource request message (i.e., an example of the first scheduling information) according to a magnitude of a data volume of the data packet #1 or the data packet #2, where a certain mapping relationship (for example, indicated by the first mapping relationship) exists between a specific PUCCH and a magnitude of a data volume or a data volume interval. After receiving the resource request message on the PUCCH, the network device determines the magnitude of the data volume of the data packet #2 according to the mapping relationship (i.e., the mapping relationship indicated by the first mapping relationship information) and contain an uplink grant in a Physical Downlink Control Channel (PDCCH), where the specific PUCCH resource includes a time-frequency resource, a time-domain resource may include a period, an offset value and the like, and a frequency-domain resource may include different Physical Resource Block (PRB) positions and the like.

Or, in at least one embodiment, the action that the relay terminal device sends the second access-stratum data packet to the network device according to the second communication protocol includes the following actions.

The relay terminal device acquires second mapping relationship information, the second mapping relationship information being configured to indicate a one-to-one mapping relationship between multiple data volume intervals and multiple preambles, where each of the data volume intervals includes at least one data volume.

The relay terminal device determines a first preamble according to the data volume interval to which the data volume of the second access-stratum data packet belongs and the second mapping relationship information, where the first preamble corresponds to the data volume interval to which the data volume of the second access-stratum data packet belongs.

The relay terminal device sends the first preamble to the network device.

The relay terminal device receives second scheduling information sent from the network device, the second scheduling information being configured to indicate a second transmission resource and a magnitude of the second transmission resource being determined by the network device according to the first preamble and the second mapping relationship information.

The relay terminal device sends the second access-stratum data packet to the network device through the second transmission resource according to the second communication protocol.

Specifically, the relay terminal device may decode the corresponding data (i.e., the data packet #1) according to the specific modulation level on the PC5 interface, and moreover, may generate the data packet #2 according to the data packet #1.

Moreover, the relay terminal device may select a specific (for example, determined according to the second mapping relationship) preamble (i.e., an example of the first preamble) for sending on the Uu interface according to the magnitude of the data volume of the relay terminal device. A mapping relationship (for example, the mapping relationship indicated by the second mapping relationship information) exists between the preamble and a data volume of a certain magnitude or a data volume interval. After receiving the preamble, the network device determines the magnitude of the data volume of the data packet #2 according to the mapping relationship and allocate the corresponding uplink grant. The uplink grant and the preamble selected by the UE may be contained in Downlink Control Information (DCI) of the PDCCH, and meanwhile, a temporary C-RNTI allocated by the network device is contained. The relay terminal device adopts the temporarily allocated C-RNTI to send the data packet #2 to the network device.

Figure 7:
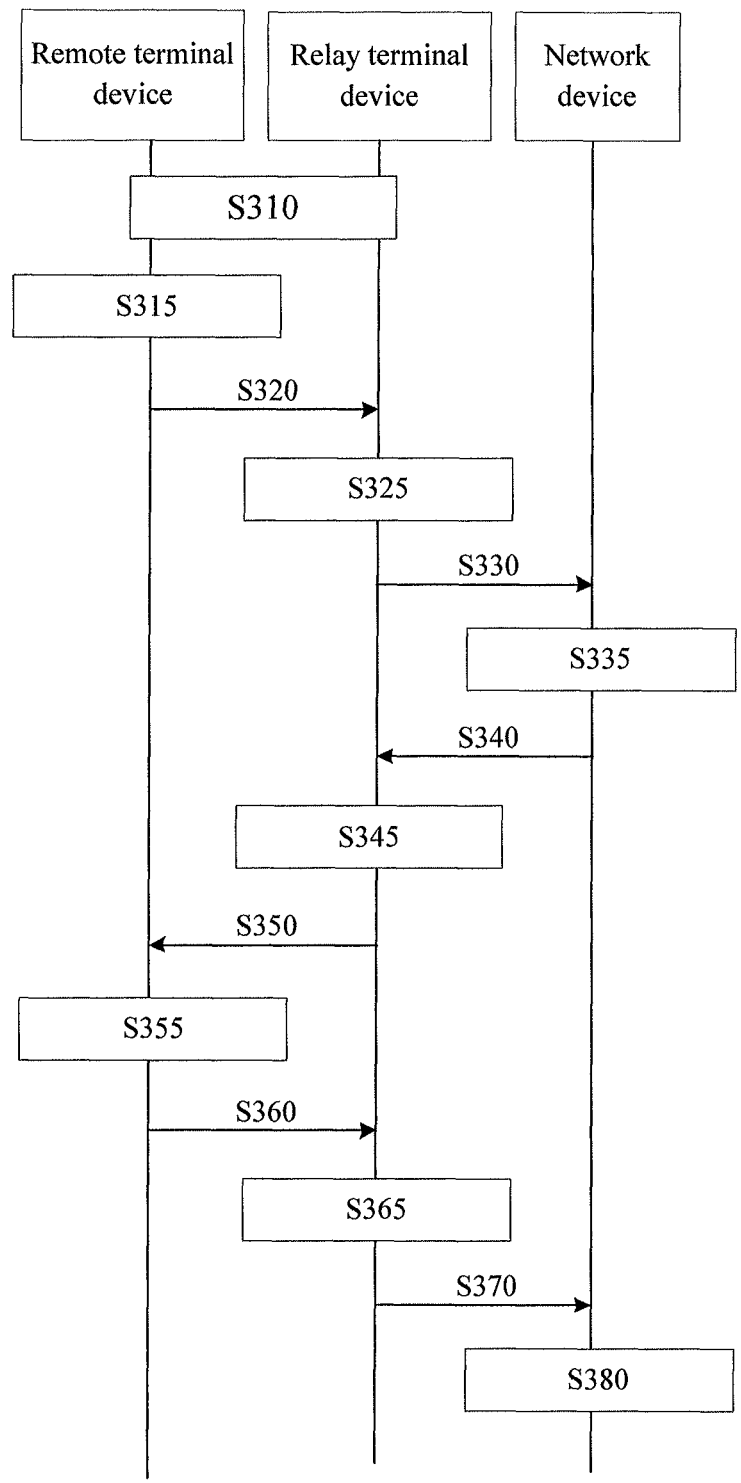
FIG. 7 is an interaction diagram of a method for establishing a RRC connection according to an embodiment of the disclosure.

FIG. 7 is an interaction diagram of a method for establishing a RRC connection according to an embodiment of the disclosure.

As shown in FIG. 7, in S310, remote terminal device may execute discovery processing, thereby discovering relay terminal device capable of serving it.

In S315, the remote terminal device generates a data packet #1 encapsulated with an RRC connection establishment request message, and moreover, the data packet #1 contains a device identifier of the remote terminal device.

In S320, the remote terminal device may send the data packet #1 to the relay terminal device through, for example, a PC5 interface, by virtue of, for example, a relay CCCH.

In S325, the relay terminal device may generate a data packet #2 containing the RRC connection establishment request message and the device identifier of the remote terminal device according to the data packet #1.

In S330, the relay terminal device may send the data packet #2 to network device through, for example, a Uu interface, by virtue of, for example, the relay CCCH.

In S335, the network device may decapsulate the data packet #2 to acquire the RRC connection establishment request message and the device identifier of the remote terminal device, determine the remote terminal device according to the device identifier of the remote terminal device and set up an RRC connection for the remote terminal device based on the RRC connection establishment request message, and moreover, may generate an RRC connection establishment message. In at least one embodiment, the network device may further allocate a specific index to the remote terminal device. Then, the network device may encapsulate the RRC connection establishment message, the device identifier of the remote terminal device and the specific index in a data packet #3.

In S340, the network device may send the data packet #3 to the relay terminal device through, for example, the Uu interface, by virtue of, for example, the relay CCCH.

In S345, the relay terminal device may generate a data packet #4 containing the RRC connection establishment message, the device identifier of the remote terminal device and the specific index according to the data packet #3.

In S350, the relay terminal device may send the data packet #4 to the network device through, for example, the PC5 interface, by virtue of, for example, the relay CCCH.

In S355, the remote terminal device may decapsulate the data packet #4 to acquire the RRC connection establishment message, the device identifier of the remote terminal device and the specific index and determine that the network device sets up the RRC connection for the remote terminal device according to the device identifier of the remote terminal device and the RRC connection establishment message, and moreover, may generate an RRC connection establishment completed message. The remote terminal device generates a data packet #5 encapsulated with the RRC connection establishment completed message, and moreover, the data packet #5 contains the device identifier of the remote terminal device or the specific index.

In S360, the remote terminal device may send the data packet #5 to the relay terminal device through, for example, the PC5 interface.

In S365, the relay terminal device may generate a data packet #6 containing the RRC connection establishment request message and the device identifier of the remote terminal device (or the specific index) according to the data packet #5.

In S370, the relay terminal device may send the data packet #6 to the network device through, for example, the Uu interface.

In S380, the network device may decapsulate the data packet #6 to acquire the RRC connection establishment request message and the device identifier of the remote terminal (or the specific index), determine the remote terminal device according to the device identifier of the remote terminal device (or the specific index) and determine that setup of the RRC connection is completed based on the RRC connection establishment completed message.

According to the method for establishing a RRC connection of the embodiment of the disclosure, remote terminal device outside coverage of network device sends a first MAC PDU bearing an RRC connection establishment request message and a device identifier of the remote terminal device to remote terminal device in the coverage of the network device, and moreover, relay terminal device parses the first MAC PDU to acquire the RRC connection establishment request message and sends a second MAC PDU bearing the RRC connection establishment request message and the device identifier of the remote terminal device to the network device, so that the network device may set up an RRC connection for the remote terminal device according to the RRC connection establishment request message and the device identifier of the remote terminal device, encapsulate an RRC connection establishment message configured to bear related information of the RRC connection and the device identifier of the remote terminal device in a third MAC PDU and send the third MAC PDU to the relay terminal device. Therefore, the RRC connection may be set up for the remote terminal device out of the coverage of the network device.

Figure 8:
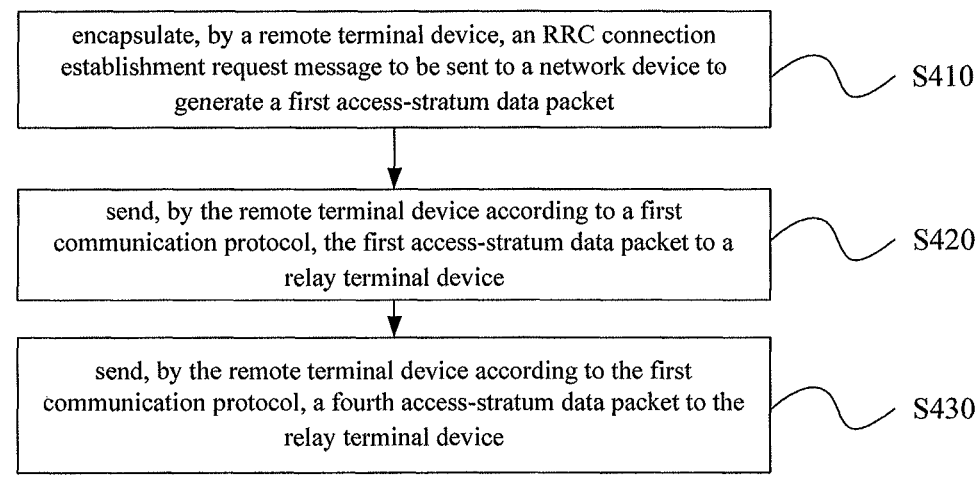
FIG. 8 is a schematic flowchart of a method for establishing a RRC connection according to another embodiment of the disclosure.

FIG. 8 is a schematic flowchart of a method 400 for establishing a RRC connection described from the angle of a remote terminal according to another embodiment of the disclosure. As shown in FIG. 8, the method 400 includes the following actions.

In S410, remote terminal device encapsulates an RRC connection establishment request message to be sent to network device to generate a first access-stratum data packet, where the first access-stratum data packet contains a device identifier of the remote terminal device.

In S420, the remote terminal device sends the first access-stratum data packet to relay terminal device according to a first communication protocol.

In S430, the remote terminal device sends a fourth access-stratum data packet to the relay terminal device according to the first communication protocol, where the fourth access-stratum data packet contains the device identifier of the remote terminal device.

In at least one embodiment, the method further includes the following actions.

The remote terminal device encapsulates the device identifier of the remote terminal device in the first access-stratum data packet in L2.

The remote terminal device acquires the device identifier of the remote terminal device from the fourth access-stratum data packet in L2.

In at least one embodiment, the method further includes the following actions.

The remote terminal device encapsulates the device identifier of the remote terminal device in the first access-stratum data packet in an ADP layer.

The remote terminal device acquires the device identifier of the remote terminal device from the fourth access-stratum data packet in the ADP layer.

In at least one embodiment, the method further includes the following actions.

The remote terminal device encapsulates the device identifier of the remote terminal device in the first access-stratum data packet in an RRC layer.

The remote terminal device acquires the device identifier of the remote terminal device from the fourth access-stratum data packet in the RRC layer.

In at least one embodiment, an ADP layer is configured in the network device and the remote terminal device, a third access-stratum data packet contains a sixth LCID, the sixth LCID is allocated to the remote terminal device by the network device, or the sixth LCID is determined by the remote terminal device based on sixth preset rule stored in the remote terminal device and the network device, the sixth LCID is encapsulated in the third access-stratum data packet by the network device in the ADP layer.

The method further includes the following actions.

The remote terminal device acquires the sixth LCID in the ADP layer according to a preset LCID contained in the fourth access-stratum data packet, where the preset LCID is encapsulated in the fourth access-stratum data packet by the relay terminal device, and the preset LCID is configured to indicate that the fourth access-stratum data packet is relay data.

In at least one embodiment, the first access-stratum data packet and the fourth access-stratum data packet are L1 data packets specified by the first communication protocol, and a second access-stratum data packet and a third access-stratum data packet are L1 data packets specified by a second communication protocol; or the first access-stratum data packet and the fourth access-stratum data packet are L2 data packets specified by the first communication protocol, and the second access-stratum data packet and the third access-stratum data packet are L2 data packets specified by the second communication protocol.

In at least one embodiment, the method further includes the following actions.

The remote terminal device generates an RRC connection establishment completed message to be sent to the network device according to the device identifier of the remote terminal device and an RRC connection establishment message.

The remote terminal device encapsulates the RRC connection establishment completed message to generate a fifth access-stratum data packet, where the fifth access-stratum data packet contains the device identifier of the remote terminal device.

The remote terminal device sends the fifth access-stratum data packet to the relay terminal device according to the first communication protocol.

Actions of the relay terminal device in the method 400 are similar to actions of the relay terminal device in the method 200, actions of the remote terminal device in the method 400 are similar to actions of the remote terminal device in the method 200 and, moreover, actions of the network device in the method 400 are similar to actions of the network device in the method 200. Detailed descriptions are omitted herein to avoid elaborations.

According to method for establishing a RRC connection of the embodiment of the disclosure, remote terminal device outside coverage of network device sends a first MAC PDU bearing an RRC connection establishment request message and a device identifier of the remote terminal device to remote terminal device in the coverage of the network device, and moreover, relay terminal device parses the first MAC PDU to acquire the RRC connection establishment request message and sends a second MAC PDU bearing the RRC connection establishment request message and the device identifier of the remote terminal device to the network device, so that the network device may set up an RRC connection for the remote terminal device according to the RRC connection establishment request message and the device identifier of the remote terminal device, encapsulate an RRC connection establishment message configured to bear related information of the RRC connection and the device identifier of the remote terminal device in a third MAC PDU and send the third MAC PDU to the relay terminal device. Therefore, the RRC connection may be set up for the remote terminal device out of the coverage of the network device.

Figure 9:
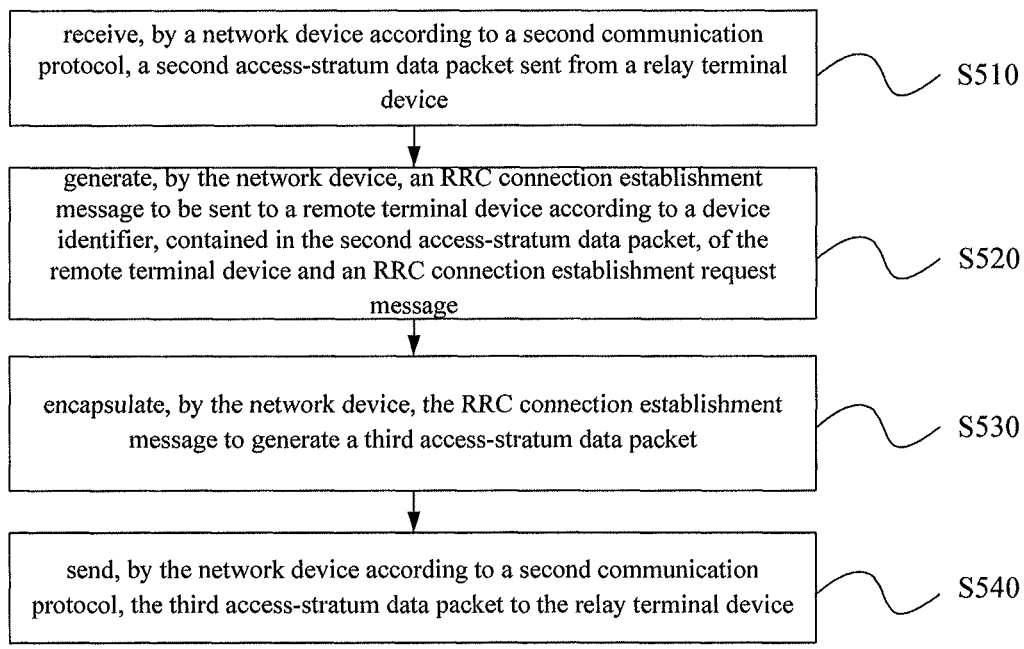
FIG. 9 is a schematic flowchart of an RRC connection establishment according to another embodiment of the disclosure.

FIG. 9 is a schematic flowchart of a method 500 for establishing a RRC connection described from the angle of network device according to another embodiment of the disclosure. As shown in FIG. 9, the method 500 includes the following actions.

In S510, network device receives a second access-stratum data packet sent from relay terminal device according to a second communication protocol, the second access-stratum data packet containing a device identifier of the remote terminal device, the second access-stratum data packet being generated by the relay terminal device according to a first access-stratum data packet and the first access-stratum data packet being generated through encapsulating, by remote terminal device, an RRC connection establishment request message to be sent to the network device.

In S520, the network device generates an RRC connection establishment message to be sent to the remote device according to the device identifier, contained in the second access-stratum data packet, of the remote terminal device and the RRC connection establishment request message.

In S530, the network device encapsulates the RRC connection establishment message to generate a third access-stratum data packet, where the third access-stratum data packet contains the device identifier of the remote terminal device.

In S540, the network device sends the third access-stratum data packet to the relay terminal device according to a second communication protocol.

In at least one embodiment, the method further includes the following actions.

The network device acquires the device identifier of the remote terminal device from the second access-stratum data packet in L2.

The network device encapsulates the device identifier of the remote terminal device in the third access-stratum data packet in L2.

In at least one embodiment, the method further includes the following actions.

The network device acquires the device identifier of the remote terminal device from the second access-stratum data packet in an ADP layer.

The network device encapsulates the device identifier of the remote terminal device in the third access-stratum data packet in the ADP layer.

In at least one embodiment, the method further includes the following actions.

The network device acquires the device identifier of the remote terminal device from the second access-stratum data packet in an RRC layer.

The network device encapsulates the device identifier of the remote terminal device in the third access-stratum data packet in the RRC layer.

In at least one embodiment, an ADP layer are configured in the network device and the remote terminal device, the first access-stratum data packet contains a third LCID, the third LCID is allocated to the remote terminal device by the network device, or the third LCID is determined by the remote terminal device based on third preset rule stored in the remote terminal device and the network device, the third LCID is encapsulated in the first access-stratum data packet by the remote terminal device in the ADP layer.

The method further includes the following actions.

The network device acquires the third LCID in the ADP layer according to a preset LCID in the second access-stratum data packet, where the preset LCID is encapsulated in the second access-stratum data packet by the relay terminal device, and the preset LCID is configured to indicate that the second access-stratum data packet is relay data.

In at least one embodiment, the action that the network device receives the second access-stratum data packet sent from the relay terminal device according to the second communication protocol includes the following actions.

The network device acquires first mapping relationship information, the first mapping relationship information being configured to indicate a one-to-one mapping relationship between multiple data volume intervals and multiple uplink channels, where each of the data volume intervals includes at least one data volume.

The network device receives a resource request message sent from the relay terminal device through a first uplink channel, where the first uplink channel corresponds to a data volume interval to which a data volume of the second access-stratum data packet belongs.

The network device determines a first transmission resource according to the first uplink channel and the first mapping relationship information.

The network device sends first scheduling information to the relay terminal device, the first scheduling information being configured to indicate the first transmission resource.

The network device receives the second access-stratum data packet sent from the relay terminal device through the first transmission resource according to the second communication protocol.

In at least one embodiment, the action that the network device receives the second access-stratum data packet sent from the relay terminal device according to the second communication protocol includes the following actions.

The network device acquires second mapping relationship information, the second mapping relationship information being configured to indicate a one-to-one mapping relationship between multiple data volume intervals and multiple preambles, where each of the data volume intervals includes at least one data volume.

The network device receives a first preamble sent from the relay terminal device, where the first preamble corresponds to the data volume interval to which the data volume of the second access-stratum data packet belongs.

The network device determines a second transmission resource according to the first preamble and the second mapping relationship information.

The network device sends second scheduling information to the relay terminal device, the second scheduling information being configured to indicate the second transmission resource.

The network device receives the second access-stratum data packet sent from the relay terminal device through the second transmission resource according to the second communication protocol.

In at least one embodiment, the method further includes the following actions.

The network device receives a sixth access-stratum data packet sent from the relay terminal device according to the second communication protocol, the sixth access-stratum data packet being generated according to a fifth access-stratum data packet and the fifth access-stratum data packet being generated through encapsulating, by the remote terminal device, an RRC connection establishment completed message to be sent to the network device, where the fifth access-stratum data packet contains the device identifier of the remote terminal device, and the sixth access-stratum data packet contains the device identifier of the remote terminal device.

In at least one embodiment, the method further includes the following actions. The network device encapsulates a specific LCID or a specific RNTI in the third access-stratum data packet, the specific LCID being configured to indicate that the third access-stratum data packet is the relay data and the specific RNTI being configured to indicate that the third access-stratum data packet is the relay data.

Actions of the relay terminal device in the method 500 are similar to actions of the relay terminal device in the method 200, actions of the remote terminal device in the method 500 are similar to actions of the remote terminal device in the method 200 and, moreover, actions of the network device in the method 500 are similar to actions of the network device in the method 200. Detailed descriptions are omitted herein to avoid elaborations.

According to the method for establishing a RRC connection of the embodiment of the disclosure, remote terminal device outside coverage of network device sends a first MAC PDU bearing an RRC connection establishment request message and a device identifier of the remote terminal device to remote terminal device in the coverage of the network device, and moreover, relay terminal device parses the first MAC PDU to acquire the RRC connection establishment request message and sends a second MAC PDU bearing the RRC connection establishment request message and the device identifier of the remote terminal device to the network device, so that the network device may set up an RRC connection for the remote terminal device according to the RRC connection establishment request message and the device identifier of the remote terminal device, encapsulate an RRC connection establishment message configured to bear related information of the RRC connection and the device identifier of the remote terminal device in a third MAC PDU and send the third MAC PDU to the relay terminal device. Therefore, the RRC connection may be set up for the remote terminal device out of the coverage of the network device.

The method for establishing a RRC connection according to the embodiment of the disclosure is described above in combination with FIG. 1 to FIG. 9 in detail, and an apparatus for establishing a RRC connection according to the embodiment of the disclosure will be described below in combination with FIG. 10 to FIG. 12 in detail.

Figure 10:
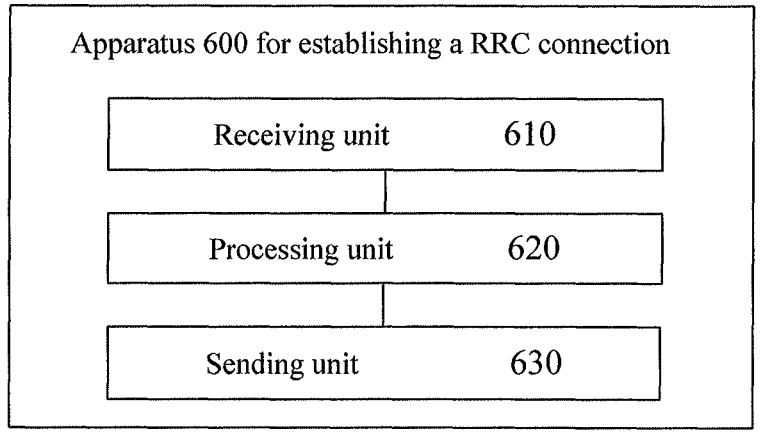
FIG. 10 is a schematic block diagram of an apparatus for establishing a RRC connection according to an embodiment of the disclosure.

FIG. 10 is a schematic block diagram of an apparatus 600 for establishing a RRC connection according to an embodiment of the disclosure. As shown in FIG. 10, the apparatus 600 includes: a receiving unit 610, a processing unit 620, and a sending unit 630.

The receiving unit 610 is configured to receive a first access-stratum data packet sent from remote terminal device according to a first communication protocol, the first access-stratum data packet being generated through encapsulating, by the remote terminal device, an RRC connection establishment request message to be sent to network device, where the first access-stratum data packet contains a device identifier of the remote terminal device.

The processing unit 620 is configured to generate a second access-stratum data packet according to the first access-stratum data packet, where the second access-stratum data packet contains the device identifier of the remote terminal device.

The sending unit 630 is configured to send the second access-stratum data packet to the network device according to a second communication protocol.

The receiving unit 610 is further configured to receive a third access-stratum data packet sent from the network device according to the second communication protocol, the third access-stratum data packet being generated through encapsulating, by the network device, an RRC connection establishment message to be sent to the remote terminal device, where the RRC connection establishment message is generated by the network device according to the device identifier of the remote terminal device and the RRC connection establishment request message, and the third access-stratum data packet contains the device identifier of the remote terminal device;

The processing unit 620 is further configured to generate a fourth access-stratum data packet according to the third access-stratum data packet, where the fourth access-stratum data packet contains the device identifier of the remote terminal device.

The sending unit 630 is further configured to send the fourth access-stratum data packet to the remote terminal device according to the first communication protocol.

In at least one embodiment, the device identifier of the remote terminal device is encapsulated in the first access-stratum data packet by the remote terminal device in L2, the device identifier of the remote terminal device is encapsulated in the third access-stratum data packet by the network device in L2.

The processing unit is further configured to acquire the device identifier of the remote terminal device from the first access-stratum data packet in L2.

The processing unit is further configured to encapsulate the device identifier of the remote terminal device in the second access-stratum data packet in L2.

The processing unit is further configured to acquire the device identifier of the remote terminal device from the third access-stratum data packet in L2.

The processing unit is further configured to encapsulate the device identifier of the remote terminal device in the fourth access-stratum data packet in L2.

In at least one embodiment, the device identifier of the remote terminal device is encapsulated in the first access-stratum data packet by the remote terminal device in an ADP layer, the device identifier of the remote terminal device is encapsulated in the third access-stratum data packet by the network device in an ADP layer.

In at least one embodiment, the device identifier of the remote terminal device is encapsulated in the first access-stratum data packet by the remote terminal device in the ADP layer, the device identifier of the remote terminal device is encapsulated in the third access-stratum data packet by the network device in L2.

The processing unit is further configured to acquire the device identifier of the remote terminal device from the first access-stratum data packet in an ADP layer.

The processing unit is further configured to encapsulate the device identifier of the remote terminal device in the second access-stratum data packet in L2.

The processing unit is further configured to acquire the device identifier of the remote terminal device from the third access-stratum data packet in L2.

The processing unit is further configured to encapsulate the device identifier of the remote terminal device in the fourth access-stratum data packet in the ADP layer.

In at least one embodiment, the device identifier of the remote terminal device is encapsulated in the first access-stratum data packet by the remote terminal device in an RRC layer, and the device identifier of the remote terminal device is encapsulated in the third access-stratum data packet by the network device in an RRC layer.

In at least one embodiment, the processing unit is further configured to acquire a first LCID from the first access-stratum data packet, where the first LCID is determined by the remote terminal device according to a first bearer.

The processing unit is further configured to determine a second LCID according to the first LCID, where the network device may determine the first bearer according to the second LCID.

The processing unit is further configured to encapsulate the second LCID in the second access-stratum data packet.

In at least one embodiment, the processing unit is further configured to, when the first LCID is allocated to the remote terminal device by the network device, determine, by the apparatus, the first LCID to be the second LCID.

The processing unit is further configured to, when the first LCID is determined by the remote terminal device based on first preset rule stored in the remote terminal device, determine, by the apparatus, an LCID corresponding to the first bearer under a second preset rule to be the second LCID, where, the first LCID corresponds to the first bearer under the first preset rule, and the second preset rule is stored in the network device.

In at least one embodiment, the ADP layers are configured in the network device and the remote terminal device, the first access-stratum data packet contains a third LCID, the third LCID is allocated to the remote terminal device by the network device, or the third LCID is determined by the remote terminal device based on third preset rule stored in the remote terminal device and the network device, the third LCID is encapsulated in the first access-stratum data packet by the remote terminal device in the ADP layer.

The processing unit is further configured to encapsulate a preset LCID in the second access-stratum data packet, where the preset LCID is configured to indicate that the second access-stratum data packet is relay data, so as to enable the network device to acquire the third LCID in the ADP layer according to the preset LCID.

In at least one embodiment, the processing unit is further configured to acquire a fourth LCID from the third access-stratum data packet, where the fourth LCID is determined by the network device according to a second bearer.

The processing unit is further configured to determine a fifth LCID according to the fourth LCID, where the remote terminal device may determine the second bearer according to the fifth LCID.

The processing unit is further configured to encapsulate the fifth LCID in the fourth access-stratum data packet.

In at least one embodiment, the processing unit is further configured to, when the fourth LCID is allocated to the remote terminal device by the network device, determine, by the apparatus, the fourth LCID to be the fifth LCID.

The processing unit is further configured to, when the fourth LCID is determined by the network device based on fourth preset rule stored in the network device, determine, by the apparatus, an LCID corresponding to the second bearer under a fifth preset rule to be the fifth LCID, where the fourth LCID corresponds to the second bearer under the fourth preset rule, the fifth preset rule is stored in the remote terminal device.

In at least one embodiment, the ADP layers are configured in the network device and the remote terminal device, the third access-stratum data packet contains a sixth LCID, the sixth LCID is allocated to the remote terminal device by the network device, or the sixth LCID is determined by the remote terminal device based on sixth preset rule stored in the remote terminal device and the network device, the sixth LCID is encapsulated in the third access-stratum data packet by the network device in the ADP layer.

The processing unit is further configured to encapsulate the preset LCID in the fourth access-stratum data packet, where the preset LCID is configured to indicate that the fourth access-stratum data packet is the relay data, so as to enable the remote terminal device to acquire the sixth LCID in the ADP layer according to the preset LCID.

In at least one embodiment, the processing unit is further configured to acquire first mapping relationship information, the first mapping relationship information being configured to indicate a one-to-one mapping relationship between multiple data volume intervals and multiple uplink channels, where each of the data volume intervals includes at least one data volume.

The processing unit is further configured to determine a first uplink channel according to a data volume interval to which a data volume of the second access-stratum data packet belongs and the first mapping relationship information, where the first uplink channel corresponds to the data volume interval to which the data volume of the second access-stratum data packet belongs.

The sending unit is further configured to send a resource request message to the network device through the first uplink channel.

The receiving unit is further configured to receive first scheduling information sent from the network device, the first scheduling information being configured to indicate a first transmission resource and a magnitude of the first transmission resource being determined by the network device according to the first uplink channel and the first mapping relationship information.

The sending unit is further configured to send the second access-stratum data packet to the network device through the first transmission resource according to the second communication protocol.

In at least one embodiment, the processing unit is further configured to acquire second mapping relationship information, the second mapping relationship information being configured to indicate a one-to-one mapping relationship between multiple data volume intervals and multiple preambles, where each of the data volume intervals includes at least one data volume.

The processing unit is further configured to determine a first preamble according to the data volume interval to which the data volume of the second access-stratum data packet belongs and the second mapping relationship information, where the first preamble corresponds to the data volume interval to which the data volume of the second access-stratum data packet belongs.

The sending unit is further configured to send the first preamble to the network device.

The receiving unit is further configured to receive second scheduling information sent from the network device, the second scheduling information being configured to indicate a second transmission resource and a magnitude of the second transmission resource being determined by the network device according to the first preamble and the second mapping relationship information.

The sending unit is further configured to send the second access-stratum data packet to the network device through the second transmission resource according to the second communication protocol.

In at least one embodiment, the first access-stratum data packet and the fourth access-stratum data packet are L1 data packets specified by the first communication protocol, and the second access-stratum data packet and the third access-stratum data packet are L1 data packets specified by the second communication protocol.

Or, the first access-stratum data packet and the fourth access-stratum data packet are L2 data packets specified by the first communication protocol, and the second access-stratum data packet and the third access-stratum data packet are L2 data packets specified by the second communication protocol.

In at least one embodiment, the receiving unit is further configured to receive a fifth access-stratum data packet sent from the remote terminal device according to the first communication protocol, the fifth access-stratum data packet being generated through encapsulating, by the remote terminal device, an RRC connection establishment completed message to be sent to the network device, where the fifth access-stratum data packet contains the device identifier of the remote terminal device, and the RRC connection establishment completed message is generated by the remote terminal device according to the device identifier of the remote terminal device and the RRC connection establishment message.

The processing unit is further configured to generate a sixth access-stratum data packet according to the fifth access-stratum data packet, where the sixth access-stratum data packet contains the device identifier of the remote terminal device.

The sending unit is further configured to send the sixth access-stratum data packet to the network device according to the second communication protocol.

The device 600 for establishing a RRC connection according to the embodiment of the disclosure may correspond to the relay terminal device in the method of the embodiment of the disclosure, and moreover, each unit, i.e., module, and the abovementioned and other operations and/or functions in the device 600 for establishing a RRC connection are adopted to implement the corresponding flows of the method 200 in FIG. 6 and will not be elaborated herein for simplicity.

According to the apparatus for establishing a RRC connection of the embodiment of the disclosure, remote terminal device outside coverage of network device sends a first MAC PDU bearing an RRC connection establishment request message and a device identifier of the remote terminal device to remote terminal device in the coverage of the network device, and moreover, relay terminal device parses the first MAC PDU to acquire the RRC connection establishment request message and sends a second MAC PDU bearing the RRC connection establishment request message and the device identifier of the remote terminal device to the network device, so that the network device may set up an RRC connection for the remote terminal device according to the RRC connection establishment request message and the device identifier of the remote terminal device, encapsulate an RRC connection establishment message configured to bear related information of the RRC connection and the device identifier of the remote terminal device in a third MAC PDU and send the third MAC PDU to the relay terminal device. Therefore, the RRC connection may be set up for the remote terminal device out of the coverage of the network device.

Figure 11:
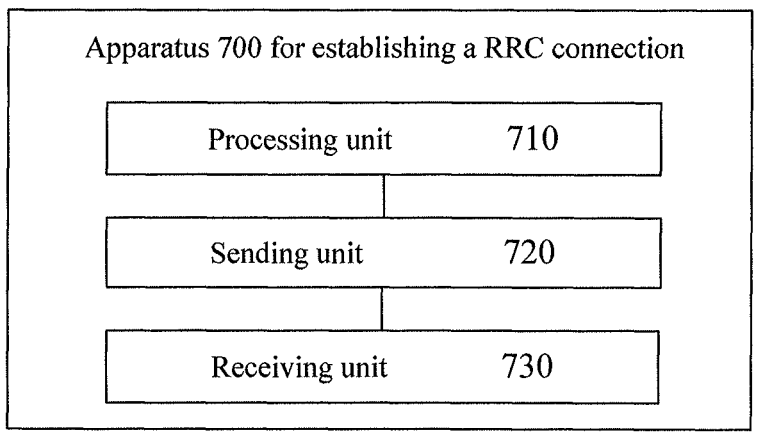
FIG. 11 is a schematic block diagram of an apparatus for establishing a RRC connection according to another embodiment of the disclosure.

FIG. 11 is a schematic block diagram of an apparatus 700 for establishing a RRC connection according to another embodiment of the disclosure. As shown in FIG. 11, the apparatus 700 includes: a processing unit 710, a sending unit 720 and a receiving unit 730.

The processing unit 710 is configured to encapsulate an RRC connection establishment request message to be sent to network device to generate a first access-stratum data packet, where the first access-stratum data packet contains a device identifier of the apparatus.

The sending unit 720 is configured to send the first access-stratum data packet to relay terminal device according to a first communication protocol.

The receiving unit 730 is configured to send a fourth access-stratum data packet to the relay terminal device according to the first communication protocol, where the fourth access-stratum data packet contains the device identifier of the apparatus.

In at least one embodiment, the processing unit is further configured to encapsulate the device identifier of the apparatus in the first access-stratum data packet.

The processing unit is further configured to acquire the device identifier of the apparatus from the fourth access-stratum data packet in L2.

In at least one embodiment, the processing unit is further configured to encapsulate the device identifier of the apparatus in the first access-stratum data packet in an ADP layer.

The processing unit is further configured to acquire the device identifier of the apparatus from the fourth access-stratum data packet in the ADP layer.

In at least one embodiment, the processing unit is further configured to encapsulate the device identifier of the apparatus in the first access-stratum data packet in an RRC layer.

The processing unit is further configured to acquire the device identifier of the apparatus from the fourth access-stratum data packet in the RRC layer.

In at least one embodiment, an ADP layer is configured in the network device and the device, a third access-stratum data packet contains a sixth LCID, the sixth LCID is allocated to the apparatus by the network device, or the sixth LCID is determined by the apparatus based on sixth preset rule stored in the apparatus and the network device, the sixth LCID is encapsulated in the third access-stratum data packet by the network device in the ADP layer.

The processing unit is further configured to acquire the sixth LCID in the ADP layer according to a preset LCID contained in the fourth access-stratum data packet, where the preset LCID is encapsulated in the fourth access-stratum data packet by the relay terminal device, and the preset LCID is configured to indicate that the fourth access-stratum data packet is relay data.

In at least one embodiment, the first access-stratum data packet and the fourth access-stratum data packet are L1 data packets specified by the first communication protocol, and a second access-stratum data packet and the third access-stratum data packet are L1 data packets specified by a second communication protocol.

Or, the first access-stratum data packet and the fourth access-stratum data packet are L2 data packets specified by the first communication protocol, and the second access-stratum data packet and the third access-stratum data packet are L2 data packets specified by the second communication protocol.

In at least one embodiment, the processing unit is further configured to generate an RRC connection establishment completed message to be sent to the network device according to the device identifier of the apparatus and an RRC connection establishment message.

The processing unit is further configured to encapsulate the RRC connection establishment completed message to generate a fifth access-stratum data packet, where the fifth access-stratum data packet contains the device identifier of the apparatus.

The sending unit is further configured to send the fifth access-stratum data packet to the relay terminal device according to the first communication protocol.

The apparatus 700 for establishing a RRC connection according to the embodiment of the disclosure may correspond to the remote terminal device in the method of the embodiment of the disclosure, and moreover, each unit, i.e., module, and the abovementioned and other operations and/or functions in the apparatus 700 for establishing a RRC connection are adopted to implement the corresponding flows of the method 400 in FIG. 8 and will not be elaborated herein for simplicity.

According to the apparatus for establishing a RRC connection of the embodiment of the disclosure, remote terminal device outside coverage of network device sends a first MAC PDU bearing an RRC connection establishment request message and a device identifier of the remote terminal device to remote terminal device in the coverage of the network device, and moreover, relay terminal device parses the first MAC PDU to acquire the RRC connection establishment request message and sends a second MAC PDU bearing the RRC connection establishment request message and the device identifier of the remote terminal device to the network device, so that the network device may establish an RRC connection for the remote terminal device according to the RRC connection establishment request message and the device identifier of the remote terminal device, encapsulate an RRC connection establishment message configured to bear related information of the RRC connection and the device identifier of the remote terminal device in a third MAC PDU and send the third MAC PDU to the relay terminal device. Therefore, the RRC connection may be set up for the remote terminal device out of the coverage of the network device.

Figure 12:
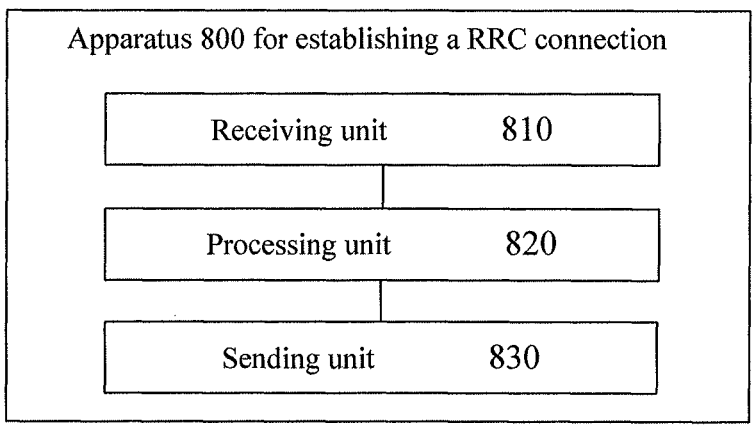
FIG. 12 is a schematic block diagram of an apparatus for establishing a RRC connection according to another embodiment of the disclosure.

FIG. 12 is a schematic block diagram of an apparatus 800 for establishing a RRC connection according to another embodiment of the disclosure. As shown in FIG. 12, the apparatus 800 includes: a receiving unit 810, a processing unit 820 and a sending unit 830.

The receiving unit 810 is configured to receive a second access-stratum data packet sent from relay terminal device according to a second communication protocol, the second access-stratum data packet containing a device identifier of remote terminal device, the second access-stratum data packet being generated by the relay terminal device according to a first access-stratum data packet and the first access-stratum data packet being generated through encapsulating, by the remote terminal device, an RRC connection establishment request message to be sent to the apparatus.

The processing unit 820 is configured to generate an RRC connection establishment message to be sent to the remote device according to the device identifier, contained in the second access-stratum data packet, of the remote terminal device and the RRC connection establishment request message.

The processing unit 820 is further configured to encapsulate the RRC connection establishment message to generate a third access-stratum data packet, where the third access-stratum data packet contains the device identifier of the remote terminal device.

The sending unit 830 is configured to send the third access-stratum data packet to the relay terminal device according to the second communication protocol.

In at least one embodiment, the processing unit is further configured to acquire the device identifier of the remote terminal device from the second access-stratum data packet in L2.

The processing unit is further configured to encapsulate the device identifier of the remote terminal device in the third access-stratum data packet in L2.

In at least one embodiment, the processing unit is further configured to acquire the device identifier of the remote terminal device from the second access-stratum data packet in an ADP layer.

The processing unit is further configured to encapsulate the device identifier of the remote terminal device in the third access-stratum data packet in the ADP layer.

In at least one embodiment, the processing unit is further configured to acquire the device identifier of the remote terminal device from the second access-stratum data packet in an RRC layer.

The processing unit is further configured to encapsulate the device identifier of the remote terminal device in the third access-stratum data packet in the RRC layer.

In at least one embodiment, an ADP layer is configured in the apparatus and the remote terminal device, the first access-stratum data packet contains a third LCID, the third LCID is allocated to the remote terminal device by the apparatus, or the third LCID is determined by the remote terminal device based on third preset rule stored in the remote terminal device and the apparatus, the third LCID is encapsulated in the first access-stratum data packet by the remote terminal device in the ADP layer.

The processing unit is further configured to acquire the third LCID in the ADP layer according to a preset LCID in the second access-stratum data packet, where the preset LCID is encapsulated in the second access-stratum data packet by the relay terminal device, and the preset LCID is configured to indicate that the second access-stratum data packet is relay data.

In at least one embodiment, the processing unit is further configured to acquire first mapping relationship information, the first mapping relationship information being configured to indicate a one-to-one mapping relationship between multiple data volume intervals and multiple uplink channels, where each of the data volume intervals includes at least one data volume.

The receiving unit is further configured to receive a resource request message sent from the relay terminal device through a first uplink channel, where the first uplink channel corresponds to a data volume interval to which a data volume of the second access-stratum data packet belongs.

The processing unit is further configured to determine a first transmission resource according to the first uplink channel and the first mapping relationship information.

The sending unit is further configured to send first scheduling information to the relay terminal device, the first scheduling information being configured to indicate the first transmission resource.

The receiving unit is further configured to receive the second access-stratum data packet sent from the relay terminal device through the first transmission resource according to the second communication protocol.

In at least one embodiment, the processing unit is further configured to acquire second mapping relationship information, the second mapping relationship information being configured to indicate a one-to-one mapping relationship between multiple data volume intervals and multiple preambles, where each of the data volume intervals includes at least one data volume.

The receiving unit is further configured to receive a first preamble sent from the relay terminal device, where the first preamble corresponds to the data volume interval to which the data volume of the second access-stratum data packet belongs.

The processing unit is further configured to determine a second transmission resource according to the first preamble and the second mapping relationship information.

The sending unit is further configured to send second scheduling information to the relay terminal device, the second scheduling information being configured to indicate the second transmission resource.

The receiving unit is further configured to receive the second access-stratum data packet sent from the relay terminal device through the second transmission resource according to the second communication protocol.

In at least one embodiment, the receiving unit is further configured to receive a sixth access-stratum data packet sent from the relay terminal device according to the second communication protocol, the sixth access-stratum data packet being generated according to a fifth access-stratum data packet and the fifth access-stratum data packet being generated through encapsulating, by the remote terminal device, an RRC connection establishment completed message to be sent to the apparatus, where the fifth access-stratum data packet contains the device identifier of the remote terminal device, and the sixth access-stratum data packet contains the device identifier of the remote terminal device.

The apparatus 800 for establishing a RRC connection according to the embodiment of the disclosure may correspond to the network device in the method of the embodiment of the disclosure, and moreover, each unit, i.e., module, and the abovementioned and other operations and/or functions in the apparatus 800 for establishing a RRC connection are adopted to implement the corresponding flows of the method 500 in FIG. 9 and will not be elaborated herein for simplicity.

According to the apparatus for establishing a RRC connection of the embodiment of the disclosure, remote terminal device outside coverage of network device sends a first MAC PDU bearing an RRC connection establishment request message and a device identifier of the remote terminal device to remote terminal device in the coverage of the network device, and moreover, relay terminal device parses the first MAC PDU to acquire the RRC connection establishment request message and sends a second MAC PDU bearing the RRC connection establishment request message and the device identifier of the remote terminal device to the network device, so that the network device may set up an RRC connection for the remote terminal device according to the RRC connection establishment request message and the device identifier of the remote terminal device, encapsulate an RRC connection establishment message configured to bear related information of the RRC connection and the device identifier of the remote terminal device in a third MAC PDU and send the third MAC PDU to the relay terminal device. Therefore, the RRC connection may be established for the remote terminal device outside the coverage of the network device.

The method for establishing a RRC connection according to the embodiment of the disclosure is described above in combination with FIG. 1 to FIG. 9 in detail, and an apparatus for establishing a RRC connection according to the embodiment of the disclosure will be described below in combination with FIG. 13 to FIG. 15 in detail.

Figure 13:
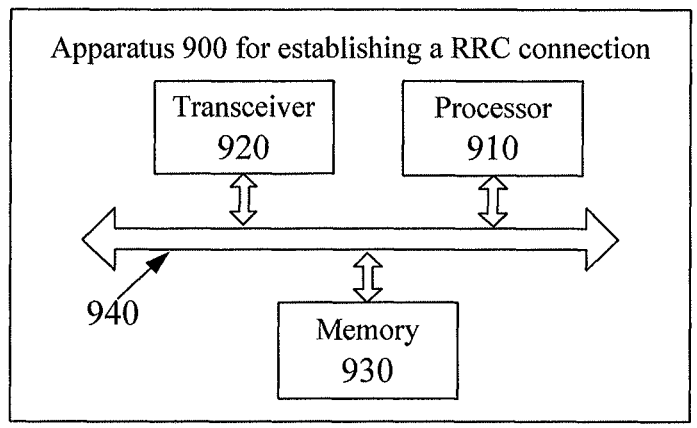
FIG. 13 is a schematic block diagram of an apparatus for establishing a RRC connection according to an embodiment of the disclosure.

FIG. 13 is a schematic structure diagram of an apparatus 900 for establishing a RRC connection according to an embodiment of the disclosure. As shown in FIG. 13, the apparatus 900 includes: a processor 910 and a transceiver 920, and the processor 910 is connected with the transceiver 920. In at least one embodiment, the apparatus 900 further includes a memory 930, and the memory 930 is connected with the processor 910. Furthermore, in at least one embodiment, the apparatus 900 includes a bus system 940, where the processor 910, the memory 930 and the transceiver 920 may be connected through the bus system 940, the memory 930 may be configured to store an instruction, and the processor 910 may be configured to execute the instruction stored in the memory 930 to control the transceiver 920 to send information or a signal.

The processor 910 is configured to control the transceiver 920 to receive a first access-stratum data packet sent from remote terminal device according to a first communication protocol, the first access-stratum data packet being generated through encapsulating, by the remote terminal device, an RRC connection establishment request message to be sent to network device, where the first access-stratum data packet contains a device identifier of the remote terminal device.

The processor 910 is configured to generate a second access-stratum data packet according to the first access-stratum data packet, where the second access-stratum data packet contains the device identifier of the remote terminal device.

The processor 910 is configured to control the transceiver 920 to send the second access-stratum data packet to the network device according to a second communication protocol.

The processor 910 is configured to control the transceiver 920 to receive a third access-stratum data packet sent from the network device according to the second communication protocol, the third access-stratum data packet being generated through encapsulating, by the network device, an RRC connection establishment message to be sent to the remote terminal device, where the RRC connection establishment message is generated by the network device according to the device identifier of the remote terminal device and the RRC connection establishment request message, and the third access-stratum data packet contains the device identifier of the remote terminal device.

The processor 910 is configured to generate a fourth access-stratum data packet according to the third access-stratum data packet, where the fourth access-stratum data packet contains the device identifier of the remote terminal device.

The processor 910 is configured to control the transceiver 920 to send the fourth access-stratum data packet to the remote terminal device according to the first communication protocol.

In at least one embodiment, the device identifier of the remote terminal device is encapsulated in the first access-stratum data packet by the remote terminal device in L2, the device identifier of the remote terminal device is encapsulated in the third access-stratum data packet by the network device in L2.

The processor 910 is configured to acquire the device identifier of the remote terminal device from the first access-stratum data packet in L2.

The processor 910 is configured to encapsulate the device identifier of the remote terminal device in the second access-stratum data packet in L2.

The processor 910 is configured to acquire the device identifier of the remote terminal device from the third access-stratum data packet in L2.

The processor 910 is configured to encapsulate the device identifier of the remote terminal device in the fourth access-stratum data packet in L2.

In at least one embodiment, the device identifier of the remote terminal device is encapsulated in the first access-stratum data packet by the remote terminal device in an ADP layer, and the device identifier of the remote terminal device is encapsulated in the third access-stratum data packet by the network device in an ADP layer.

In at least one embodiment, the device identifier of the remote terminal device is encapsulated in the first access-stratum data packet by the remote terminal device in the ADP layer, the device identifier of the remote terminal device is encapsulated in the third access-stratum data packet by the network device in L2.

The processor 910 is configured to acquire the device identifier of the remote terminal device from the first access-stratum data packet in an ADP layer.

The processor 910 is configured to encapsulate the device identifier of the remote terminal device in the second access-stratum data packet in L2.

The processor 910 is configured to acquire the device identifier of the remote terminal device from the third access-stratum data packet in L2.

The processor 910 is configured to encapsulate the device identifier of the remote terminal device in the fourth access-stratum data packet in the ADP layer.

In at least one embodiment, the device identifier of the remote terminal device is encapsulated in the first access-stratum data packet by the remote terminal device in an RRC layer, and the device identifier of the remote terminal device is encapsulated in the third access-stratum data packet by the network device in an RRC layer.

In at least one embodiment, the processor 910 is configured to acquire a first LCID from the first access-stratum data packet, where the first LCID is determined by the remote terminal device according to a first bearer.

The processor 910 is configured to determine a second LCID according to the first LCID, where the network device may determine the first bearer according to the second LCID.

The processor 910 is configured to encapsulate the second LCID in the second access-stratum data packet.

In at least one embodiment, when the first LCID is allocated to the remote terminal device by the network device, the processor 910 is configured to determine the first LCID to be the second LCID.

When the first LCID is determined by the remote terminal device based on first preset rule stored in the remote terminal device, the processor 910 is configured to determine an LCID corresponding to the first bearer under a second preset rule to be the second LCID, where, the first LCID corresponds to the first bearer under the first preset rule, the second preset rule is stored in the network device.

In at least one embodiment, the ADP layers are configured in the network device and the remote terminal device, the first access-stratum data packet contains a third LCID, the third LCID is allocated to the remote terminal device by the network device, or the third LCID is determined by the remote terminal device based on third preset rule stored in the remote terminal device and the network device, the third LCID is encapsulated in the first access-stratum data packet by the remote terminal device in the ADP layer.

The processor 910 is configured to encapsulate a preset LCID in the second access-stratum data packet, where the preset LCID is configured to indicate that the second access-stratum data packet is relay data to enable the network device to acquire the third LCID in the ADP layer according to the preset LCID.

In at least one embodiment, the processor 910 is configured to acquire a fourth LCID from the third access-stratum data packet, where the fourth LCID is determined by the network device according to a second bearer.

The processor 910 is configured to determine a fifth LCID according to the fourth LCID, where the remote terminal device may determine the second bearer according to the fifth LCID.

The processor 910 is configured to encapsulate the fifth LCID in the fourth access-stratum data packet.

In at least one embodiment, when the fourth LCID is allocated to the remote terminal device by the network device, the processor 910 is configured to determine the fourth LCID to be the fifth LCID.

When the fourth LCID is determined by the network device based on fourth preset rule stored in the network device, the processor 910 is configured to determine an LCID corresponding to the second bearer under a fifth preset rule to be the fifth LCID, where the fourth LCID corresponds to the second bearer under the fourth preset rule, the fifth preset rule is stored in the remote terminal device.

In at least one embodiment, an ADP layer is configured in the network device and the remote terminal device, the third access-stratum data packet contains a sixth LCID, the sixth LCID is allocated to the remote terminal device by the network device, or the sixth LCID is determined by the remote terminal device based on a sixth preset rule stored in the remote terminal device and the network device, the sixth LCID is encapsulated in the third access-stratum data packet by the network device in the ADP layer.

The processor 910 is configured to encapsulate the preset LCID in the fourth access-stratum data packet, where the preset LCID is configured to indicate that the fourth access-stratum data packet is the relay data, so as to enable the remote terminal device to acquire the sixth LCID in the ADP layer according to the preset LCID.

In at least one embodiment, the processor 910 is configured to acquire first mapping relationship information, the first mapping relationship information being configured to indicate a one-to-one mapping relationship between multiple data volume intervals and multiple uplink channels, where each of the data volume intervals includes at least one data volume.

The processor 910 is configured to determine a first uplink channel according to a data volume interval to which a data volume of the second access-stratum data packet belongs and the first mapping relationship information, where the first uplink channel corresponds to the data volume interval to which the data volume of the second access-stratum data packet belongs.

The processor 910 is configured to control the transceiver 920 to send a resource request message to the network device through the first uplink channel.

The processor 910 is configured to control the transceiver 920 to receive first scheduling information sent from the network device, the first scheduling information being configured to indicate a first transmission resource and a magnitude of the first transmission resource being determined by the network device according to the first uplink channel and the first mapping relationship information.

The processor 910 is configured to control the transceiver 920 to send the second access-stratum data packet to the network device through the first transmission resource according to the second communication protocol.

In at least one embodiment, the processor 910 is configured to acquire second mapping relationship information, the second mapping relationship information being configured to indicate a one-to-one mapping relationship between multiple data volume intervals and multiple preambles, where each of the data volume intervals includes at least one data volume.

The processor 910 is configured to determine a first preamble according to the data volume interval to which the data volume of the second access-stratum data packet belongs and the second mapping relationship information, where the first preamble corresponds to the data volume interval to which the data volume of the second access-stratum data packet belongs.

The processor 910 is configured to control the transceiver 920 to send the first preamble to the network device.

The processor 910 is configured to control the transceiver 920 to receive second scheduling information sent from the network device, the second scheduling information being configured to indicate a second transmission resource and a magnitude of the second transmission resource being determined by the network device according to the first preamble and the second mapping relationship information.

The processor 910 is configured to control the transceiver 920 to send the second access-stratum data packet to the network device through the second transmission resource according to the second communication protocol.

In at least one embodiment, the first access-stratum data packet and the fourth access-stratum data packet are L1 data packets specified by the first communication protocol, and the second access-stratum data packet and the third access-stratum data packet are L1 data packets specified by the second communication protocol.

Or, the first access-stratum data packet and the fourth access-stratum data packet are L2 data packets specified by the first communication protocol, and the second access-stratum data packet and the third access-stratum data packet are L2 data packets specified by the second communication protocol.

In at least one embodiment, the processor 910 is configured to control the transceiver 920 to receive a fifth access-stratum data packet sent from the remote terminal device according to the first communication protocol, the fifth access-stratum data packet being generated through encapsulating, by the remote terminal device, an RRC connection establishment completed message to be sent to the network device, where the fifth access-stratum data packet contains the device identifier of the remote terminal device, and the RRC connection establishment completed message is generated by the remote terminal device according to the device identifier of the remote terminal device and the RRC connection establishment message.

The processor 910 is configured to generate a sixth access-stratum data packet according to the fifth access-stratum data packet, where the sixth access-stratum data packet contains the device identifier of the remote terminal device.

The processor 910 is configured to control the transceiver 920 to send the sixth access-stratum data packet to the network device according to the second communication protocol.

The apparatus 900 for establishing a RRC connection according to the embodiment of the disclosure may correspond to the relay terminal device in the method of the embodiment of the disclosure, and moreover, each unit, i.e., module, and the abovementioned and other operations and/or functions in the device 900 for establishing a RRC connection are adopted to implement the corresponding flows of the method 200 in FIG. 6 and will not be elaborated herein for simplicity.

According to the apparatus for establishing a RRC connection of the embodiment of the disclosure, remote terminal device outside coverage of network device sends a first MAC PDU bearing an RRC connection establishment request message and a device identifier of the remote terminal device to remote terminal device in the coverage of the network device, and moreover, relay terminal device parses the first MAC PDU to acquire the RRC connection establishment request message and sends a second MAC PDU bearing the RRC connection establishment request message and the device identifier of the remote terminal device to the network device, so that the network device may establish an RRC connection for the remote terminal device according to the RRC connection establishment request message and the device identifier of the remote terminal device, encapsulate an RRC connection establishment message configured to bear related information of the RRC connection and the device identifier of the remote terminal device in a third MAC PDU and send the third MAC PDU to the relay terminal device. Therefore, the RRC connection may be set up for the remote terminal device out of the coverage of the network device.

Figure 14:
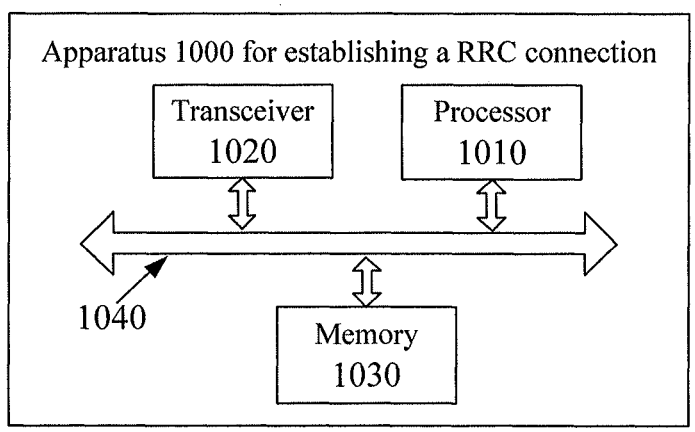
FIG. 14 is a schematic block diagram of an apparatus for establishing a RRC connection according to another embodiment of the disclosure.

FIG. 14 is a schematic block diagram of an apparatus 1000 for establishing a RRC connection according to another embodiment of the disclosure. As shown in FIG. 14, the device 1000 includes: a processor 1010 and a transceiver 1020, and the processor 1010 is connected with the transceiver 1020. In at least one embodiment, the apparatus 1000 further includes a memory 1030, and the memory 1030 is connected with the processor 1010. Furthermore, in at least one embodiment, the apparatus 1000 includes a bus system 1040, where the processor 1010, the memory 1030 and the transceiver 1020 may be connected through the bus system 1040, the memory 1030 may be configured to store an instruction, and the processor 1010 may be configured to execute the instruction stored in the memory 1030 to control the transceiver 1020 to send information or a signal.

The processor 1010 is configured to encapsulate an RRC connection establishment request message to be sent to network device to generate a first access-stratum data packet, where the first access-stratum data packet contains a device identifier of the apparatus 1000.

The processor 1010 is configured to control the transceiver 1020 to send the first access-stratum data packet to relay terminal device according to a first communication protocol.

The processor 1010 is configured to control the transceiver 1020 to send a fourth access-stratum data packet to the relay terminal device according to the first communication protocol, where the fourth access-stratum data packet contains the device identifier of the apparatus 1000.

In at least one embodiment, the processor 1010 is configured to encapsulate the device identifier of the apparatus 1000 in the first access-stratum data packet in L2.

The processor 1010 is configured to acquire the device identifier of the apparatus 1000 from the fourth access-stratum data packet in L2.

In at least one embodiment, the processor 1010 is configured to encapsulate the device identifier of the apparatus 1000 in the first access-stratum data packet in an ADP layer.

The processor 1010 is configured to acquire the device identifier of the apparatus 1000 from the fourth access-stratum data packet in the ADP layer.

In at least one embodiment, the processor 1010 is configured to encapsulate the device identifier of the apparatus 1000 in the first access-stratum data packet in an RRC layer.

The processor 1010 is configured to acquire the device identifier of the apparatus 1000 from the fourth access-stratum data packet in the RRC layer.

In at least one embodiment, ADP layers are configured in the network device and the apparatus 1000, a third access-stratum data packet contains a sixth LCID, the sixth LCID is allocated to the apparatus 1000 by the network device, or the sixth LCID is determined by the processor 1010 based on sixth preset rule stored in the apparatus 1000 and the network device, the sixth LCID is encapsulated in the third access-stratum data packet by the network device in the ADP layer.

The processor 1010 is configured to acquire the sixth LCID in the ADP layer according to a preset LCID contained in the fourth access-stratum data packet, where the preset LCID is encapsulated in the fourth access-stratum data packet by the relay terminal device, and the preset LCID is configured to indicate that the fourth access-stratum data packet is relay data.

In at least one embodiment, the first access-stratum data packet and the fourth access-stratum data packet are L1 data packets specified by the first communication protocol, and a second access-stratum data packet and the third access-stratum data packet are L1 data packets specified by a second communication protocol.

Or, the first access-stratum data packet and the fourth access-stratum data packet are L2 data packets specified by the first communication protocol, and the second access-stratum data packet and the third access-stratum data packet are L2 data packets specified by the second communication protocol.

In at least one embodiment, the processor 1010 is configured to generate an RRC connection establishment completed message to be sent to the network device according to the device identifier of the apparatus and an RRC connection establishment message.

The processor 1010 is configured to encapsulate the RRC connection establishment completed message to generate a fifth access-stratum data packet, where the fifth access-stratum data packet contains the device identifier of the apparatus 1000.

The processor 1010 is configured to control the transceiver 1020 to send the fifth access-stratum data packet to the relay terminal device according to the first communication protocol.

The apparatus 1000 for establishing a RRC connection according to the embodiment of the disclosure may correspond to the remote terminal device in the method of the embodiment of the disclosure, and moreover, each unit, i.e., module, and the abovementioned and other operations and/or functions in the apparatus 1000 for establishing a RRC connection are adopted to implement the corresponding flows of the method 400 in FIG. 8 and will not be elaborated herein for simplicity.

According to the apparatus for establishing a RRC connection of the embodiment of the disclosure, remote terminal device outside coverage of network device sends a first MAC PDU bearing an RRC connection establishment request message and a device identifier of the remote terminal device to remote terminal device in the coverage of the network device, and moreover, relay terminal device parses the first MAC PDU to acquire the RRC connection establishment request message and sends a second MAC PDU bearing the RRC connection establishment request message and the device identifier of the remote terminal device to the network device, so that the network device may establish an RRC connection for the remote terminal device according to the RRC connection establishment request message and the device identifier of the remote terminal device, encapsulate an RRC connection establishment message configured to bear related information of the RRC connection and the device identifier of the remote terminal device in a third MAC PDU and send the third MAC PDU to the relay terminal device. Therefore, the RRC connection may be set up for the remote terminal device out of the coverage of the network device.

Figure 15:
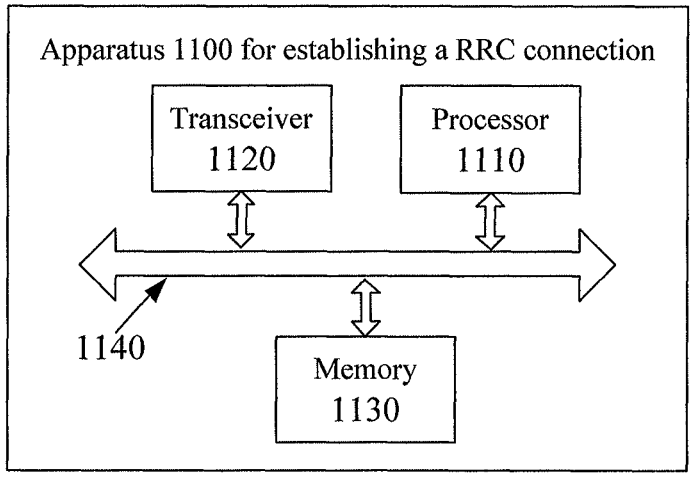
FIG. 15 is a schematic block diagram of an apparatus for establishing a RRC connection according to another embodiment of the disclosure.

FIG. 15 is a schematic block diagram of an apparatus 1100 for establishing a RRC connection according to another embodiment of the disclosure. As shown in FIG. 15, the apparatus 1100 includes: a processor 1110 and a transceiver 1120, and the processor 1110 is connected with the transceiver 1120. In at least one embodiment, the apparatus 1100 further includes a memory 1130, and the memory 1130 is connected with the processor 1110. Furthermore, in at least one embodiment, the apparatus 1100 includes a bus system 1140, where the processor 1110, the memory 1130 and the transceiver 1120 may be connected through the bus system 1140, the memory 1130 may be configured to store an instruction, and the processor 1110 may be configured to execute the instruction stored in the memory 1130 to control the transceiver 1120 to send information or a signal.

The processor 1110 is configured to control the transceiver 1120 to receive a second access-stratum data packet sent from relay terminal device according to a second communication protocol, the second access-stratum data packet containing a device identifier of remote terminal device, the second access-stratum data packet being generated by the relay terminal device according to a first access-stratum data packet and the first access-stratum data packet being generated through encapsulating, by the remote terminal device, an RRC connection establishment request message to be sent to the processor 1110.

The processor 1110 is configured to generate an RRC connection establishment message to be sent to the remote device according to the device identifier, contained in the second access-stratum data packet, of the remote terminal device and the RRC connection establishment request message.

The processor 1110 is configured to encapsulate the RRC connection establishment message to generate a third access-stratum data packet, where the third access-stratum data packet contains the device identifier of the remote terminal device.

The processor 1110 is configured to control the transceiver 1120 to send the third access-stratum data packet to the relay terminal device according to the second communication protocol.

In at least one embodiment, the processor 1110 is configured to acquire the device identifier of the remote terminal device from the second access-stratum data packet in L2.

The processor 1110 is configured to encapsulate the device identifier of the remote terminal device in the third access-stratum data packet in L2.

In at least one embodiment, the processor 1110 is configured to acquire the device identifier of the remote terminal device from the second access-stratum data packet in an ADP layer.

The processor 1110 is configured to encapsulate the device identifier of the remote terminal device in the third access-stratum data packet in the ADP layer.

In at least one embodiment, the processor 1110 is configured to acquire the device identifier of the remote terminal device from the second access-stratum data packet in an RRC layer.

The processor 1110 is configured to encapsulate the device identifier of the remote terminal device in the third access-stratum data packet in the RRC layer.

In at least one embodiment, an ADP layer is configured in the device 1100 and the remote terminal device, the first access-stratum data packet contains a third LCID, the third LCID is allocated to the remote terminal device by the apparatus 1100, or the third LCID is determined by the remote terminal device based on third preset rule stored in the remote terminal device and the apparatus 1100, the third LCID is encapsulated in the first access-stratum data packet by the remote terminal device in the ADP layer.

The processor 1110 is configured to acquire the third LCID in the ADP layer according to a preset LCID in the second access-stratum data packet, where the preset LCID is encapsulated in the second access-stratum data packet by the relay terminal device, and the preset LCID is configured to indicate that the second access-stratum data packet is relay data.

In at least one embodiment, the processor 1110 is configured to acquire first mapping relationship information, the first mapping relationship information being configured to indicate a one-to-one mapping relationship between multiple data volume intervals and multiple uplink channels, where each of the data volume intervals includes at least one data volume.

The processor 1110 is configured to control the transceiver 1120 to receive a resource request message sent from the relay terminal device through a first uplink channel, where the first uplink channel corresponds to a data volume interval to which a data volume of the second access-stratum data packet belongs.

The processor 1110 is configured to determine a first transmission resource according to the first uplink channel and the first mapping relationship information.

The processor 1110 is configured to control the transceiver 1120 to send first scheduling information to the relay terminal device. The first scheduling information is configured to indicate the first transmission resource.

The processor 1110 is configured to control the transceiver 1120 to receive the second access-stratum data packet sent from the relay terminal device through the first transmission resource according to the second communication protocol.

In at least one embodiment, the processor 1110 is configured to acquire second mapping relationship information, the second mapping relationship information being configured to indicate a one-to-one mapping relationship between multiple data volume intervals and multiple preambles, where each of the data volume intervals includes at least one data volume.

The processor 1110 is configured to control the transceiver 1120 to receive a first preamble sent from the relay terminal device, where the first preamble corresponds to the data volume interval to which the data volume of the second access-stratum data packet belongs.

The processor 1110 is configured to determine a second transmission resource according to the first preamble and the second mapping relationship information.

The processor 1110 is configured to control the transceiver 1120 to send second scheduling information to the relay terminal device, the second scheduling information being configured to indicate the second transmission resource.

The processor 1110 is configured to control the transceiver 1120 to receive the second access-stratum data packet sent from the relay terminal device through the second transmission resource according to the second communication protocol.

In at least one embodiment, the processor 1110 is configured to control the transceiver 1120 to receive a sixth access-stratum data packet sent from the relay terminal device according to the second communication protocol, the sixth access-stratum data packet being generated according to a fifth access-stratum data packet and the fifth access-stratum data packet being generated through encapsulating, by the remote terminal device, an RRC connection establishment completed message to be sent to the processor 1110, where the fifth access-stratum data packet contains the device identifier of the remote terminal device, and the sixth access-stratum data packet contains the device identifier of the remote terminal device.

The apparatus 1100 for establishing a RRC connection according to the embodiment of the disclosure may correspond to the network device in the method of the embodiment of the disclosure, and moreover, each unit, i.e., module, and the abovementioned and other operations and/or functions in the apparatus 1100 for establishing a RRC connection are adopted to implement the corresponding flows of the method 500 in FIG. 9 and will not be elaborated herein for simplicity.

According to the apparatus for establishing a RRC connection of the embodiment of the disclosure, remote terminal device outside coverage of network device sends a first MAC PDU bearing an RRC connection establishment request message and a device identifier of the remote terminal device to remote terminal device in the coverage of the network device, and moreover, relay terminal device parses the first MAC PDU to acquire the RRC connection establishment request message and sends a second MAC PDU bearing the RRC connection establishment request message and the device identifier of the remote terminal device to the network device, so that the network device may set up an RRC connection for the remote terminal device according to the RRC connection establishment request message and the device identifier of the remote terminal device, encapsulate an RRC connection establishment message configured to bear related information of the RRC connection and the device identifier of the remote terminal device in a third MAC PDU and send the third MAC PDU to the relay terminal device. Therefore, the RRC connection may be set up for the remote terminal device out of the coverage of the network device.

It should be noted that the method embodiment of the disclosure may be applied to a processor or implemented by the processor. The processor may be an integrated circuit chip with a signal processing capability. In an implementation process, each action of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, action and logical block diagram disclosed in the embodiments of the disclosure may be implemented or executed. The universal processor may be a microprocessor or the processor may also be any conventional processor and the like. The actions of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the actions of the methods in combination with hardware.

It can be understood that the memory in the embodiment of the disclosure may be a volatile memory or a nonvolatile memory, or may include both the volatile and nonvolatile memories, where the nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is important to note that the memory of a system and method described in the disclosure is intended to include, but not limited to, memories of these and any other proper types.

It should be understood that the protocol layers listed above are only exemplary descriptions and not specially limited in the disclosure. For example, names or functions may be freely changed according to a network or system during a specific application. For example, functions of some protocol layers may also be integrated into a new protocol layer. Moreover, the functions of each protocol layer are only exemplary descriptions and not intended to limit the disclosure. Each function, which may be executed in the conventional art, of each protocol layer falls within the scope of protection of the disclosure.

It should be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

Those of ordinary skilled in the art may realize that the units and algorithm actions of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by virtue of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the application, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, network device or the like) to execute all or part of the actions of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A relay terminal apparatus for establishing a Radio Resource Control (RRC) connection, the apparatus being applied in a communication system comprising a remote terminal device, the apparatus and a network device, the remote terminal device communicating with the apparatus based on a first communication protocol, and the apparatus communicating with the network device based on a second communication protocol, the apparatus comprising a transceiver, a processor and a memory storing instructions that, when executed by the processor, cause the processor to perform following operations comprising:

receiving, through the transceiver, a first access-stratum data packet sent from the remote terminal device according to the first communication protocol, the first access-stratum data packet being generated through encapsulating, by the remote terminal device, an RRC connection establishment request message to be sent to the network device, wherein the first access-stratum data packet contains a device identifier of the remote terminal device;

generating a second access-stratum data packet according to the first access-stratum data packet, wherein the second access-stratum data packet contains the device identifier of the remote terminal device;

sending, through the transceiver, the second access-stratum data packet to the network device according to the second communication protocol;

receiving, through the transceiver, a third access-stratum data packet sent from the network device according to the second communication protocol, the third access-stratum data packet being generated through encapsulating, by the network device, an RRC connection establishment message to be sent to the remote terminal device, wherein the RRC connection establishment message is generated by the network device according to the device identifier of the remote terminal device and the RRC connection establishment request message, and the third access-stratum data packet contains the device identifier of the remote terminal device;

generating a fourth access-stratum data packet according to the third access-stratum data packet, wherein the fourth access-stratum data packet contains the device identifier of the remote terminal device; and sending, through the transceiver, the fourth access-stratum data packet to the remote terminal device according to the first communication protocol, wherein sending, through the transceiver, the second access-stratum data packet to the network device according to the second communication protocol comprises:

(a) acquiring first mapping relationship information, the first mapping relationship information being configured to indicate a one-to-one mapping relationship between a plurality of data volume intervals and a plurality of uplink channels, wherein each of the data volume intervals comprises at least one data volume;

determining a first uplink channel according to a data volume interval to which a data volume of the second access-stratum data packet belongs and the first mapping relationship information, wherein the first uplink channel corresponds to the data volume interval to which the data volume of the second access-stratum data packet belongs;

sending, through the transceiver, a resource request message to the network device through the first uplink channel;

receiving, through the transceiver, first scheduling information sent from the network device, the first scheduling information being configured to indicate a first transmission resource and a magnitude of the first transmission resource being determined by the network device according to the first uplink channel and the first mapping relationship information; and sending, through the transceiver, the second access-stratum data packet to the network device through the first transmission resource according to the second communication protocol;

or, (b) acquiring second mapping relationship information, the second mapping relationship information being configured to indicate a one-to-one mapping relationship between a plurality of data volume intervals and a plurality of preambles, wherein each of tire data volume intervals comprises at least one data volume;

determining a first preamble according to a data volume interval to which a data volume of the second access-stratum data packet belongs and the second mapping relationship information, wherein the first preamble corresponds to the data volume interval to which the data volume of the second access-stratum data packet belongs;

sending, through the transceiver, the first preamble to the network device;

receiving, through the transceiver, second scheduling information sent from the network device, the second scheduling information being configured to indicate a second transmission resource and a magnitude of the second transmission resource being determined by the network device according to the first preamble and the second mapping relationship information; and sending, through the transceiver, the second access-stratum data packet to the network device through the second transmission resource according to the second communication protocol.

2. The relay terminal apparatus according to claim 1, wherein the device identifier of the remote terminal device is encapsulated in the first access-stratum data packet by the remote terminal device in Layer 2 (L2), the device identifier of the remote terminal device is encapsulated in the third access-stratum data packet by the network device in L2, and the processor is further configured to acquire the device identifier of the remote terminal device from the first access-stratum data packet in L2;

the processor is further configured to encapsulate the device identifier of the remote terminal device in the second access-stratum data packet in L2;

the processor is further configured to acquire the device identifier of the remote terminal device from the third access-stratum data packet in L2; and the processor is further configured to encapsulate the device identifier of the remote terminal device in the fourth access-stratum data packet in L2.

3. The relay terminal apparatus according to claim 1, wherein the device identifier of the remote terminal device is encapsulated in the first access-stratum data packet by the remote terminal device in an adaptive layer, and the device identifier of the remote terminal device is encapsulated in the third access-stratum data packet by the network device in the adaptive layer, or wherein the device identifier of the remote terminal device is encapsulated in the first access-stratum data packet by the remote terminal device in an RRC layer, and the device identifier of the remote terminal device is encapsulated in the third access-stratum data packet by the network device in the RRC layer.

4. The relay terminal apparatus according to claim 1, wherein the device identifier of the remote terminal device is encapsulated in the first access-stratum data packet by the remote terminal device in the adaptive layer, the device identifier of the remote terminal device is encapsulated in the third access-stratum data packet by the network device in L2, and the processor is further configured to acquire the device identifier of the remote terminal device from the first access-stratum data packet in an adaptive layer;

the processor is further configured to encapsulate the device identifier of the remote terminal device in the second access-stratum data packet in L2;

the processor is further configured to acquire the device identifier of the remote terminal device from the third access-stratum data packet in L2; and the processor is further configured to encapsulate the device identifier of the remote terminal device in the fourth access-stratum data packet in the adaptive layer.

5. The relay terminal apparatus according to claim 1, wherein the processor is further configured to acquire a first Logical Channel Identifier (LCID) from the first access-stratum data packet, wherein the first LCID is determined by the remote terminal device according to a first bearer;

the processor is further configured to determine a second LCID according to the first LCID, wherein the network device determines the first bearer according to the second LCID; and the processor is further configured to encapsulate the second LCID in the second access-stratum data packet.

6. The relay terminal apparatus according to claim 5, wherein the processor is further configured to, when the first LCID is allocated to the remote terminal device by the network device, determine, by the apparatus, the first LCID to be the second LCID; and the processor is further configured to, when the first LCID is determined by the remote terminal device based CHI a first preset rule stored in the remote terminal device, determine, by the apparatus, an LCID corresponding to the first bearer under a second preset rule to be the second LCID, the first LCID corresponding to the first bearer under the first preset rule, the second preset rule being stored in the network device.

7. The relay terminal apparatus according to claim 1, wherein an adaptive layer is configured in the network device and the remote terminal device, the first access-stratum data packet contains a third LCID, the third LCID is allocated to the remote terminal device by the network device, or the third LCID is determined by the remote terminal device based on a third preset rule stored in the remote terminal device and the network device, the third LCID is encapsulated in the first access-stratum data packet by the remote terminal device in the adaptive layer, and the processor is further configured to encapsulate a preset LCID in the second access-stratum data packet, wherein the preset LCID is configured to indicate that the second access-stratum data packet is relay data, so as to enable the network device to acquire the third LCID in the adaptive layer according to the preset LCID.

8. The relay terminal apparatus according to claim 1, wherein the processor is further configured to acquire a fourth LCID from the third access-stratum data packet, wherein the fourth LCID is determined by the network device according to a second bearer;

the processor is further configured to determine a fifth LCID according to the fourth LCID, wherein the remote terminal device determines the second bearer according to the fifth LCID; and the processor is further configured to encapsulate the fifth LCID in the fourth access-stratum data packet.

9. The relay terminal apparatus according to claim 8, wherein the processor is further configured to, when the fourth LCID is allocated to the remote terminal device by the network device, determine, by the apparatus, the fourth LCID to be the fifth LCID; and the processor is further configured to, when the fourth LCID is determined by the network device based on fourth preset rule stored in the network device, determine, by the apparatus, an LCID corresponding to the second bearer under a fifth preset rule to be the fifth LCID, the fourth LCID corresponding to the second bearer under the fourth preset rule, the fifth preset rule being stored in the remote terminal device.

10. The relay terminal apparatus according to claim 1, wherein an adaptive layer is configured in the network device and the remote terminal device, the third access-stratum data packet contains a sixth LCID, the sixth LCID is allocated to the remote terminal device by the network device, or the sixth LCID is determined by the remote terminal device based on a sixth preset rule stored in the remote terminal device and the network device, the sixth LCID is encapsulated in the third access-stratum data packet by the network device in the adaptive layer, and the processor is further configured to encapsulate the preset LCID in the fourth access-stratum data packet, wherein the preset LCID is configured to indicate that the fourth access-stratum data packet is the relay data, so as to enable the remote terminal device to acquire the sixth LCID in the adaptive layer according to the preset LCID.

11. The relay terminal apparatus according to claim 1, wherein the first access-stratum data packet and the fourth access-stratum data packet are data packets specified by the first communication protocol, and the second access-stratum data packet and the third access-stratum data packet are data packets specified by the second communication protocol.

12. The relay terminal apparatus according to claim 1, wherein the transceiver is further configured to receive a fifth access-stratum data packet sent from the remote terminal device according to the first communication protocol, the fifth access-stratum data packet being generated through encapsulating, by the remote terminal device, an RRC connection establishment completed message to be sent to the network device, wherein the fifth access-stratum data packet contains the device identifier of the remote terminal device, and the RRC connection establishment completed message is generated by the remote terminal device according to the device identifier of the remote terminal device and the RRC connection establishment message;

the processor is further configured to generate a sixth access-stratum data packet according to the fifth access-stratum data packet, wherein the sixth access-stratum data packet contains the device identifier of the remote terminal device; and the transceiver is further configured to send the sixth access-stratum data packet to the network device according to the second communication protocol.

13. A remote terminal apparatus for establishing a Radio Resource Control (RRC) connection, the apparatus being applied in a communication system comprising the apparatus, a relay terminal device and a network device, the apparatus communicating with the relay terminal device based on a first communication protocol, and the relay terminal device communicating with the network device based on a second communication protocol, the apparatus comprising a transceiver, a processor and a memory storing instructions that, when executed by the processor, cause the processor to perform the following operations comprising:

encapsulating an RRC connection establishment request message to be sent to the network device to generate a first access-stratum data packet, wherein the first access-stratum data packet contains a device identifier of the apparatus;

sending, through the transceiver, the first access-stratum data packet to the relay terminal device according to the first communication protocol so that (a): the relay terminal device generates a second access-stratum data packet according to the first access-stratum data packet, acquires first mapping relationship information, the first mapping relationship information being configured to indicate a one-to-one mapping relationship between a plurality of data volume intervals and a plurality of uplink channels, wherein each of the data volume intervals comprises at least one data volume: determines a first unlink channel according to a data volume interval to which a data volume of the second access-stratum data packet belongs and the first mapping relationship information, wherein the first uplink channel corresponds to the data volume interval to which the data volume of the second access-stratum data packet belongs; sends a resource request message to the network device through the first uplink channel, and receives first scheduling information sent from the network device, the first scheduling information being configured to indicate a first transmission resource and a magnitude of the first transmission resource being determined by the network dev ice according to the first uplink channel and the first mapping relationship information; and sends the second access-stratum data packet to the network device through the first transmission resource according to the second communication protocol; or (b): the relay terminal dev ice generates a second access-stratum data packet according to the first access-stratum data packet, acquires second mapping relationship information, the second mapping relationship information being configured to indicate a one-to-one mapping relationship between a plurality of data volume intervals and a plurality of preambles, wherein each of the data volume intervals comprises at least one data volume; determines a first preamble according to a data volume interval to which a data volume of the second access-stratum data packet belongs and the second mapping relationship information, wherein the first preamble corresponds to the data volume interval to which the data volume of the second access-stratum data packet belongs; sends the first preamble to the network device, and receives second scheduling information sent from the network device, the second scheduling information being configured to indicate a second transmission resource and a magnitude of the second transmission resource being determined by the network device according to the first preamble and the second mapping relationship information; and sends the second access-stratum data packet to the network device through the second transmission resource according to the second communication protocol; and receiving, through the transceiver a fourth access-stratum data packet from the relay terminal device according to the first communication protocol, wherein the fourth access-stratum data packet contains the device identifier of the apparatus.

14. The remote terminal apparatus according to claim 13, wherein the processor is further configured to encapsulate the device identifier of the apparatus in the first access-stratum data packet; and the processor is further configured to acquire the device identifier of the apparatus from the fourth access-stratum data packet in Layer 2 (L2).

15. The remote terminal apparatus according to claim 13, wherein the processor is further configured to encapsulate the device identifier of the apparatus in the first access-stratum data packet in an adaptive layer; and the processor is further configured to acquire the device identifier of the apparatus from the fourth access-stratum data packet in the adaptive layer, or wherein the processor is further configured to encapsulate the device identifier of the apparatus in the first access-stratum data packet in an RRC layer; and the processor is further configured to acquire the device identifier of the apparatus from the fourth access-stratum data packet in the RRC layer.

16. The remote terminal apparatus according to claim 13, wherein an adaptive layer is configured in the network device and the apparatus, a third access-stratum data packet contains a sixth Logical Channel Identifier (LCID), the sixth LCID is allocated to the apparatus by the network device, or the sixth LCID is determined by the apparatus based CHI sixth preset rule stored in the apparatus and the network device, the sixth LCID is encapsulated in the third access-stratum data packet by the network device in the adaptive layer, and the processor is further configured to acquire the sixth LCID in the adaptive layer according to a preset LCID contained in the fourth access-stratum data packet, wherein the preset LCID is encapsulated in the fourth access-stratum data packet by the relay terminal device, and the preset LCID is configured to indicate that the fourth access-stratum data packet is relay data.

17. The remote terminal apparatus according to claim 13, wherein the processor is further configured to generate an RRC connection establishment completed message to be sent to the network device according to the device identifier of the apparatus and an RRC connection establishment message;

the processor is further configured to encapsulate the RRC connection establishment completed message to generate a fifth access-stratum data packet, wherein the fifth access-stratum data packet contains the device identifier of the apparatus; and the transceiver is further configured to send the fifth access-stratum data packet to the relay terminal device according to the first communication protocol.

18. A network apparatus for establishing a Radio Resource Control (RRC) connection, the apparatus being applied in a communication system comprising a remote terminal device, a relay terminal device and the apparatus, the remote terminal device communicating with the relay terminal device based on a first communication protocol and the relay terminal device communicating with the apparatus based on a second communication protocol, the apparatus comprising a transceiver, a processor and a memory storing instructions that, when executed by the processor, cause the processor to perform the following operations comprising:

receiving, through the transceiver, a second access-stratum data packet sent from the relay terminal device according to the second communication protocol, the second access-stratum data packet containing a device identifier of the remote terminal device, the second access-stratum data packet being generated by the relay terminal device according to a first access-stratum data packet, and the first access-stratum data packet being generated through encapsulating, by the remote terminal device, an RRC connection establishment request message to be sent to the apparatus;

generating an RRC connection establishment message to be sent to the remote terminal device according to the device identifier, contained in the second access-stratum data packet, of the remote terminal device and the RRC connection establishment request message, capsulating the RRC connection establishment message to generate a third access-stratum data packet, wherein the third access-stratum data packet contains the device identifier of the remote terminal device; and sending, through the transceiver, the third access-stratum data packet to the relay terminal device according to the second communication protocol, wherein receiving, through the transceiver, the second access-stratum data packet sent from the relay terminal device according to the second communication protocol comprises:

(a) acquiring first mapping relationship information, the first mapping relationship information being configured to indicate a one to one mapping relationship between a plurality of data volume intervals and a plurality of uplink channels, wherein each of the data volume intervals comprises at least one data volume;

receiving, through the transceiver, a resource request message sent from the relay terminal device through a first uplink channel, wherein the first uplink channel corresponds to a data volume interval to which a data volume of the second access-stratum data packet belongs;

determining a first transmission resource according to the first uplink channel and the first mapping relationship information;

sending, through the transceiver, first scheduling information to the relay terminal device, the first scheduling information being configured to indicate the first transmission resource; and receiving, through the transceiver, the second access-stratum data packet sent from the relay terminal device through the first transmission resource according to the second communication protocol;

or (b) acquiring second mapping relationship information, the second mapping relationship information being configured to indicate a one-to-one mapping relationship between a plurality of data volume intervals and a plurality of preambles, wherein each of the data volume intervals comprises at least one data volume;

receiving, through the transceiver, a first preamble sent from the relay terminal device, wherein the first preamble corresponds to foe data volume interval to which the data volume of the second access-stratum data packet belongs;

determining a second transmission resource according to the first preamble and the second mapping relationship information;

sending, through the transceiver, second scheduling information to the relay terminal device, the second scheduling information being configured to indicate the second transmission resource; and receiving, through the transceiver, live second access-stratum data packet sent from live relay terminal device through the second transmission resource according to the second communication protocol.

* * * * *